(12) United States Patent
Jang et al.

(10) Patent No.: US 12,034,225 B2
(45) Date of Patent: Jul. 9, 2024

(54) ANTENNA AND ELECTRONIC DEVICE INCLUDING THE SAME

(71) Applicant: SAMSUNG ELECTRONICS CO., LTD., Suwon-si (KR)

(72) Inventors: Sooyoung Jang, Suwon-si (KR); Dongryul Shin, Suwon-si (KR); Gyubok Park, Suwon-si (KR); Donghun Shin, Suwon-si (KR); Minkyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/901,100

(22) Filed: Sep. 1, 2022

(65) Prior Publication Data

US 2023/0046925 A1    Feb. 16, 2023

Related U.S. Application Data

(63) Continuation of application No. PCT/KR2022/011936, filed on Aug. 10, 2022.

(30) Foreign Application Priority Data

Aug. 10, 2021  (KR) .................. 10-2021-0105046
Jan. 11, 2022  (KR) .................. 10-2022-0004039

(51) Int. Cl.
  *H01Q 5/371*  (2015.01)
  *H01Q 1/38*  (2006.01)

(52) U.S. Cl.
  CPC .............. *H01Q 5/371* (2015.01); *H01Q 1/38* (2013.01)

(58) Field of Classification Search
  CPC ............ H01Q 5/371; H01Q 1/38; H01Q 1/50; H01Q 5/328; H01Q 9/42; H01Q 1/243
  See application file for complete search history.

(56) References Cited

U.S. PATENT DOCUMENTS 10,224,607 B2 *  3/2019  Kim .................. H01Q 21/28
10,826,175 B2 * 11/2020  Okayama ............ H01Q 1/2225
(Continued)

FOREIGN PATENT DOCUMENTS

CN        106898865      10/2020
KR      2016-0027700      3/2016
(Continued)

OTHER PUBLICATIONS

Search Report and Written Opinion dated Nov. 17, 2022 in corresponding International Patent Application No. PCT/KR2022/011936.

*Primary Examiner* — Seung H Lee
(74) *Attorney, Agent, or Firm* — Nixon & Vanderhye, P.C.

(57) ABSTRACT

An example electronic device may include: a side member including a first conductive portion disposed through a first non-conductive portion and a second non-conductive portion and a second conductive portion disposed through the second non-conductive portion and a third non-conductive portion; a substrate disposed in the internal space of the housing and including a ground; at least one wireless communication circuit disposed on the substrate; a first switching circuit disposed in a first electrical path connecting the wireless communication circuit and a first point of the first conductive portion; a second switching circuit disposed in a second electrical path connecting the wireless communication circuit and a second point of the second conductive portion; a third switching circuit disposed in a third electrical path connecting the wireless communication circuit and a third point of the second conductive portion between the second point and the third non-conductive portion; and at least one processor configured to control at least one switching circuit among the first, second, and third switching circuits, wherein the second switching circuit is (Continued)

electrically connected to another—first point between the first point and the second non-conductive portion through another—first electrical path.

20 Claims, 35 Drawing Sheets

(56) References Cited

U.S. PATENT DOCUMENTS

| | | | |
|---|---|---|---|
| 11,025,761 B1* | 6/2021 | Shim | H04M 1/0202 |
| 2012/0202092 A1* | 8/2012 | Idzik | H01M 8/04955 |
| | | | 429/50 |
| 2016/0064820 A1 | 3/2016 | Kim et al. | |
| 2017/0047639 A1 | 2/2017 | Lee et al. | |
| 2017/0244818 A1 | 8/2017 | Kim et al. | |
| 2019/0067797 A1 | 2/2019 | Jung et al. | |
| 2021/0135351 A1 | 5/2021 | Son et al. | |
| 2022/0115768 A1 | 4/2022 | Oh et al. | |

FOREIGN PATENT DOCUMENTS

| | | |
|---|---|---|
| KR | 10-2017-0018682 | 2/2017 |
| KR | 10-1740831 | 5/2017 |
| KR | 10-2017-0098400 | 8/2017 |
| KR | 10-2019-0024497 | 3/2019 |
| KR | 10-2020-0100986 | 8/2020 |
| KR | 10-2021-0054262 | 5/2021 |
| KR | 10-2021-0075834 | 6/2021 |

* cited by examiner

ANTENNA AND ELECTRONIC DEVICE INCLUDING THE SAME

CROSS-REFERENCE TO RELATED APPLICATIONS

This application is a continuation of International Application No. PCT/KR2022/011936 designating the United States, filed on Aug. 10, 2022, in the Korean Intellectual Property Receiving Office and claiming priority to Korean Patent Application No. 10-2021-0105046, filed on Aug. 10, 2021, in the Korean Intellectual Property Office, and to Korean Patent Application No. 10-2022-0004039, filed on Jan. 11, 2022, in the Korean Intellectual Property Office, the disclosures of which are incorporated by reference herein in their entireties.

FIELD

Various embodiments of the disclosure relate to an antenna and an electronic device including the same.

DESCRIPTION OF RELATED ART

As the functional gap between manufacturers decreases, electronic devices are becoming slimmer to meet consumer's purchasing needs. Also, electronic devices are being upgraded by increasing rigidity, enhancing design aspects, and differentiating their functions. As part of this trend, electronic devices are being developed to exhibit excellent radiation performance through structural change of at least one antenna, which must be provided for communication among their components.

SUMMARY

An electronic device may include a housing structure for providing a space for accommodating electronic components. The housing structure may include a first plate (e.g., front cover), a second plate (e.g., rear cover) opposite to the first plate, and a side member disposed to surround the space between the first plate and the second plate. The side member may include a support member extending at least partially into the internal space of the electronic device. This side member may be formed, at least in part, of a metallic material (e.g., conductive member, conductive portion, or conductive material) to reinforce the rigidity of the electronic device and/or to perform a specified function (e.g., antenna function), and the remaining part may be formed of a polymer material (e.g., non-conductive member, non-conductive portion, or non-conductive material) combined with a metallic material. The conductive portion of the side member may include at least one antenna formed through at least one non-conductive portion (e.g., cut-out portion).

For antennas used in an electronic device (mobile electronic device or mobile terminal), the volume and number of antennas to be mounted may be determined according to the service frequency, bandwidth, and/or type. For example, a low band of about 600 MHz to 960 MHz, a mid band of about 1700 MHz to 2200 MHz, a high band of about 2300 MHz to 2800 MHz, or a super high frequency band of about 3 GHz to 300 GHz (e.g., 5G (NR)) (e.g., UHB/FR1, about 3.2 GHz to 4.5 GHz) can be used as a main communication band. As another example, various wireless communication services such as Bluetooth (BT), global positioning system (GPS), or wireless fidelity (Wi-Fi) may be used. While a plurality of antennas should be included in an electronic device to support the above-described communication bands, as electronic devices gradually become slimmer or the area occupied by the display increases, the space for disposing antennas may be reduced in the electronic devices. To overcome this, service bands having similar frequency ranges may be bundled and designed as separate multiple antennas.

When such an antenna is individually implemented to operate in all frequency bands supported by the electronic device, it may fail to satisfy criteria with respect to the operator's specification, specific absorption rate (SAR), and/or minimization of human impact. Hence, one antenna may be implemented to operate in a plurality of frequency bands. For example, the antenna may be configured to operate in multiple bands, such as low band and mid band, mid band and high band, and/or mid band, high band and NR (new radio or 5G new radio) band by including at least one matching circuit (e.g., matching time constant or lumped constant element) disposed in the electrical path.

However, as the number of antennas increases to meet the increasing frequency bands in electronic devices that are gradually becoming slimmer, there may be physical limitations in implementing optimal radiation performance in various bands. Moreover, radiation performance may be deteriorated due to dielectric interference according to the user's grip of the electronic device.

Various embodiments of the disclosure can provide an antenna for improving radiation performance through appropriate segmentation and feeding of a conductive member used as a side member, and an electronic device including the same.

Various embodiments can provide an antenna configured to reduce a degree of reduction in radiation performance according to a user's grip, and an electronic device including the same.

According to various embodiments, an electronic device may include: a housing; a side member that is disposed in at least some of the housing and includes a first side surface, a second side surface extending perpendicular to one end of the first side surface, a third side surface extending parallel to the first side surface from the second side surface, a fourth side surface connected from the third side surface to the first side surface and parallel to the second side surface, a first conductive portion disposed between a first non-conductive portion and a second non-conductive portion spaced apart at a specified interval in the first side surface, and a second conductive portion disposed between the second non-conductive portion and a third non-conductive portion formed on the second side surface; a substrate disposed in an internal space of the housing and including a ground; at least one wireless communication circuit disposed on the substrate; a first switching circuit disposed in a first electrical path connecting the at least one wireless communication circuit and a first point of the first conductive portion; a second switching circuit disposed in a second electrical path connecting the at least one wireless communication circuit and a second point of the second conductive portion; a third switching circuit disposed in a third electrical path connecting the at least one wireless communication circuit and a third point of the second conductive portion between the second point and the third non-conductive portion; and at least one processor configured to control at least one switching circuit among the first, second, and third switching circuits, wherein the second switching circuit may be electrically connected to another—first point between the first point and the second non-conductive portion through another—first electrical path.

An electronic device according to non-limiting example embodiments of the disclosure provides conductive portions used as an antenna radiator through an asymmetric segmental structure using a two-segment structure disposed on a first side surface of a conductive side member and a one-segment structure disposed on a second side surface adjacent to the first side surface, provides switching circuits (e.g., switches or tunable ICs) in feeding lines connected to the conductive portions, and operates the antenna through feeding lines appropriately selected according to the state of the electronic device (e.g., user's grip or operating frequency band for each service), which can reduce the degree of radiation performance reduction and help extended antenna design.

In addition, it is possible to provide various effects that are directly or indirectly identified through this document.

BRIEF DESCRIPTION OF THE DRAWINGS

The above and other aspects, features and advantages of certain embodiments of the present disclosure will be more apparent from the following detailed description, taken in conjunction with the accompanying drawings. In connection with the description of the drawings, the same or similar reference numerals may be used for the same or similar components.

DETAILED DESCRIPTION

Figure 1:
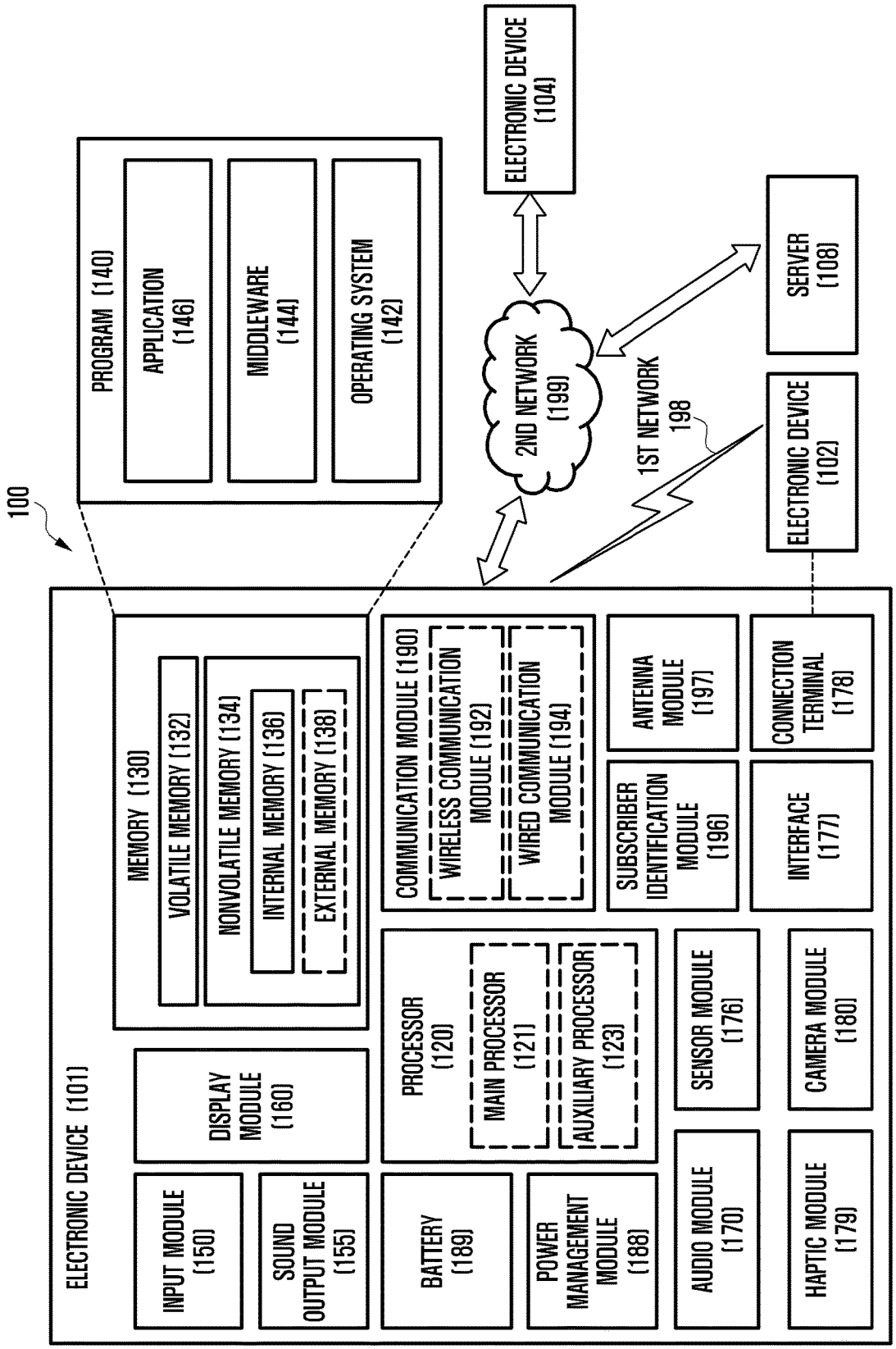
FIG. 1 is a block diagram of an example electronic device in a network environment according to various embodiments of the disclosure.

FIG. 1 illustrates an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
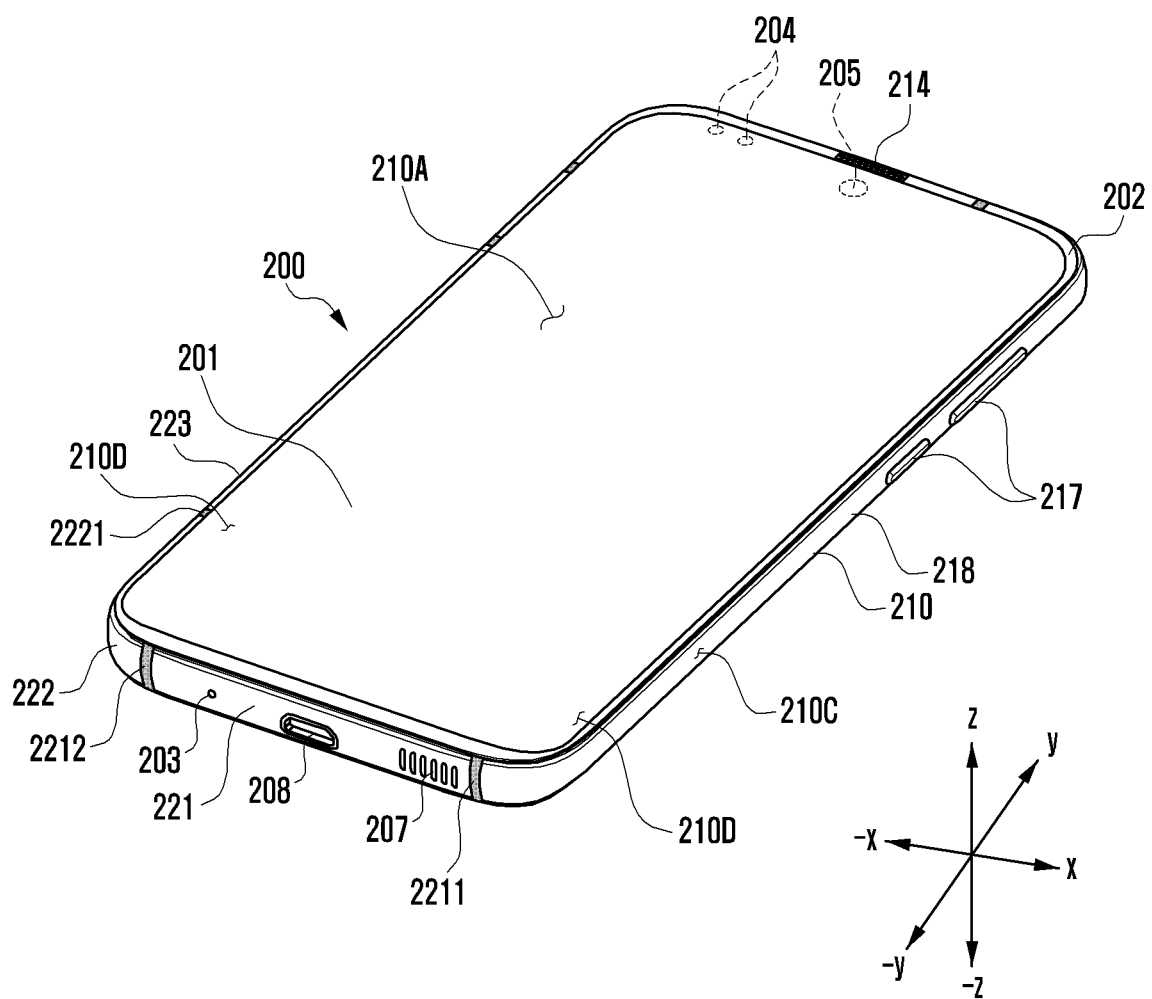
FIG. 2A is a front perspective view of an example electronic device according to various embodiments of the disclosure.
Figure 2B:
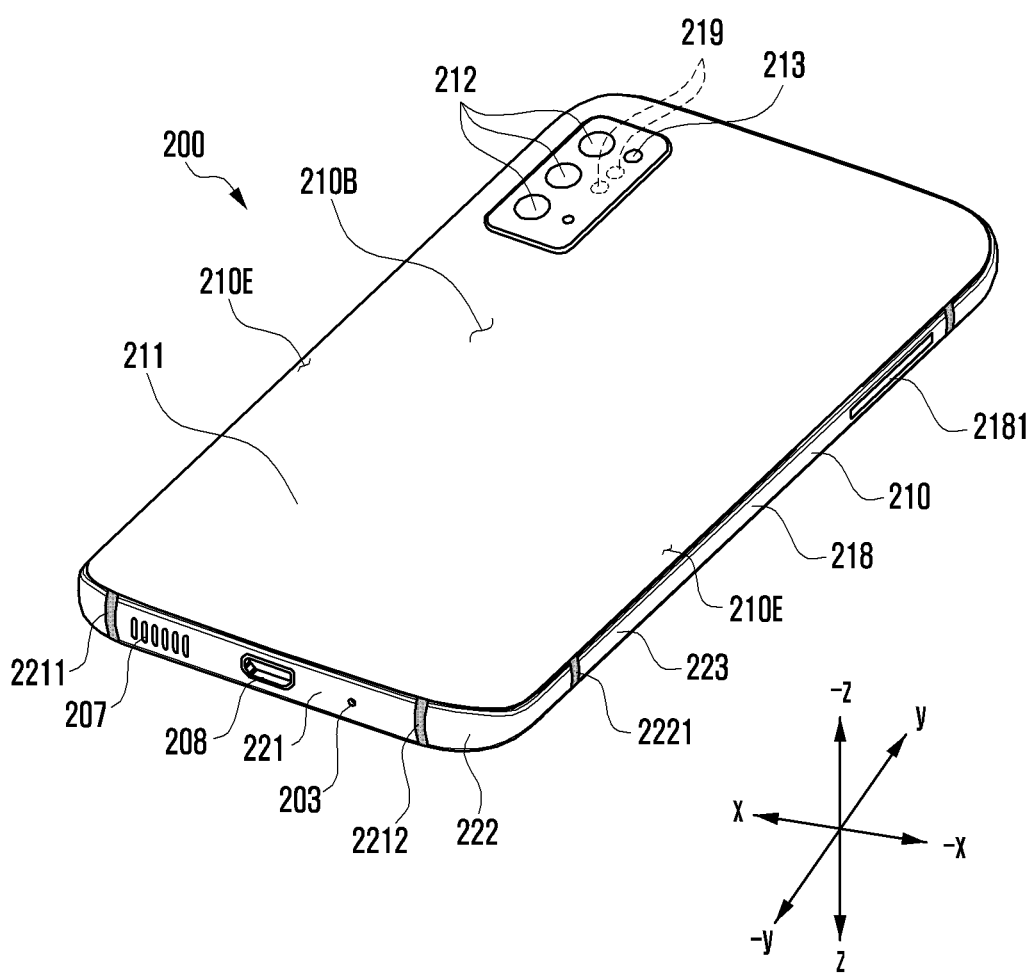
FIG. 2B is a rear perspective view of an example electronic device according to various embodiments of the disclosure.

FIG. 2A is a perspective view illustrating a front surface of a mobile electronic device according to an embodiment of the disclosure. FIG. 2B is a perspective view illustrating a rear surface of the electronic device of FIG. 2A according to an embodiment of the disclosure.

An electronic apparatus 200 of FIG. 2A and FIG. 2B may be at least partially similar to the electronic apparatus 101 of FIG. 1 or may further include other embodiments of an electronic apparatus.

Referring to FIGS. 2A and 2B, according to an embodiment, an electronic device 200 may include a housing 210 that includes a first surface (or front surface) 210A, a second surface (or rear surface) 210B, and a lateral surface 210C that surrounds a space between the first surface 210A and the second surface 210B. According to an embodiment, the housing 210 may refer, for example, to a structure that forms a part of the first surface 210A, the second surface 210B, and the lateral surface 210C. According to an embodiment, the first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may include, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

In the shown embodiment, the front plate 202 may include two first regions 210D disposed at long edges thereof, respectively, and bent and extended seamlessly from the first surface 210A toward the rear plate 211. In the shown embodiment, the rear plate 211 may include two second regions 210E disposed at long edges thereof, respectively, and bent and extended seamlessly from the second surface 210B toward the front plate 202 (refer to FIG. 2B). In various embodiments, the front plate 202 (or the rear plate 211) may include only one of the first regions 210D (or of the second regions 210E). In various embodiments, the first regions 210D or the second regions 210E may be omitted in part. In various embodiments, when viewed from a lateral side of the electronic device 200, the lateral bezel structure 218 may have a first thickness (or width) on a lateral side where one of the first regions 210D or one of the second regions 210E is not included, and may have a second thickness, being less than the first thickness, on another lateral side where one of the first regions 210D or one of the second regions 210E is included.

According to an embodiment, the electronic device 200 may include at least one of a display 201, audio modules 203, 207 and 214, sensor modules 204, 216 and 219, camera modules 205, 212 and 213, key input devices 217, a light emitting device 206, and connector holes 208 and 209. In various embodiments, the electronic device 200 may omit at least one (e.g., the key input devices 217 or the light emitting device 206) of the above components, or may further include other components.

The display 201 may be exposed through a substantial portion of the front plate 202, for example. In various embodiments, at least a part of the display 201 may be exposed through the front plate 202 that forms the first surface 210A and the first regions 210D. In various embodiments, outlines (i.e., edges and corners) of the display 201 may have substantially the same form as those of the front plate 202. In an embodiment (not shown), the spacing between the outline of the display 201 and the outline of the front plate 202 may be substantially unchanged in order to enlarge the exposed area of the display 201.

The audio modules 203, 207 and 214 may correspond to a microphone hole (e.g., the audio module 203) and speaker holes (e.g., the audio modules 207 and 214). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 204, 216 and 219 may generate electrical signals or data corresponding to an internal operating state of the electronic device 200 or to an external environmental condition. The sensor modules 204, 216 and 219 may include a first sensor module (e.g., the sensor module 204) (e.g., a proximity sensor) and/or a second sensor module (e.g., a fingerprint sensor) disposed on the first surface 210A of the housing 210, and/or a third sensor module (e.g., the sensor module 219) (e.g., a heart rate monitor (HRM) sensor) and/or a fourth sensor module (e.g., the sensor module 216) (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device (e.g., the camera module 205) disposed on the first surface 210A of the electronic device 200, and a second camera device (e.g., the camera module 212) and/or a flash (e.g., the camera module 213) disposed on the second surface 210B. The camera module 205 or the camera module 212 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 200.

The key input devices 217 may be disposed on the lateral surface 210C of the housing 210. In an embodiment, the electronic device 200 may not include some or all of the key input devices 217 described above, and the key input devices 217 which are not included may be implemented in another form such as a soft key on the display 201. In various embodiments, the key input devices 217 may include the sensor module 216 disposed on the second surface 210B of the housing 210.

The light emitting device may be disposed on the first surface 210A of the housing 210, for example. For example, the light emitting device 206 may provide status information of the electronic device 200 in an optical form. In various embodiments, the light emitting device 206 may provide a light source associated with the operation of the camera module 205. The light emitting device 206 may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

According to various embodiments, the electronic device 200 may include conductive portions 221, 222 and 223 segmented through non-conductive portions 2211, 2212 and 2221 (e.g., cut-off portions) disposed on at least a part of the conductive side bezel structure 218. According to an embodiment, the conductive portions 221, 222 and 223 may include a first conductive portion 221 segmented through a first non-conductive portion 2211 and a second non-conductive portion 2212 spaced apart from each other at a preset interval on the first side surface of the electronic device 200, a second conductive portion 222 segmented through the second non-conductive portion 2212 and a third non-conductive portion 2221 formed on the second side surface adjacent to the first side surface of the electronic device 200, and a third conductive portion 223 segmented through the third non-conductive portion 2221. According to an embodiment, the first, second and third conductive portions 221, 222 and 223 may operate as an antenna selectively or simultaneously in a plurality of frequency bands through plural conductive lines (e.g., feeding lines) electrically connected to a wireless communication circuit (e.g., wireless communication module 192 in FIG. 1).

Figure 3:
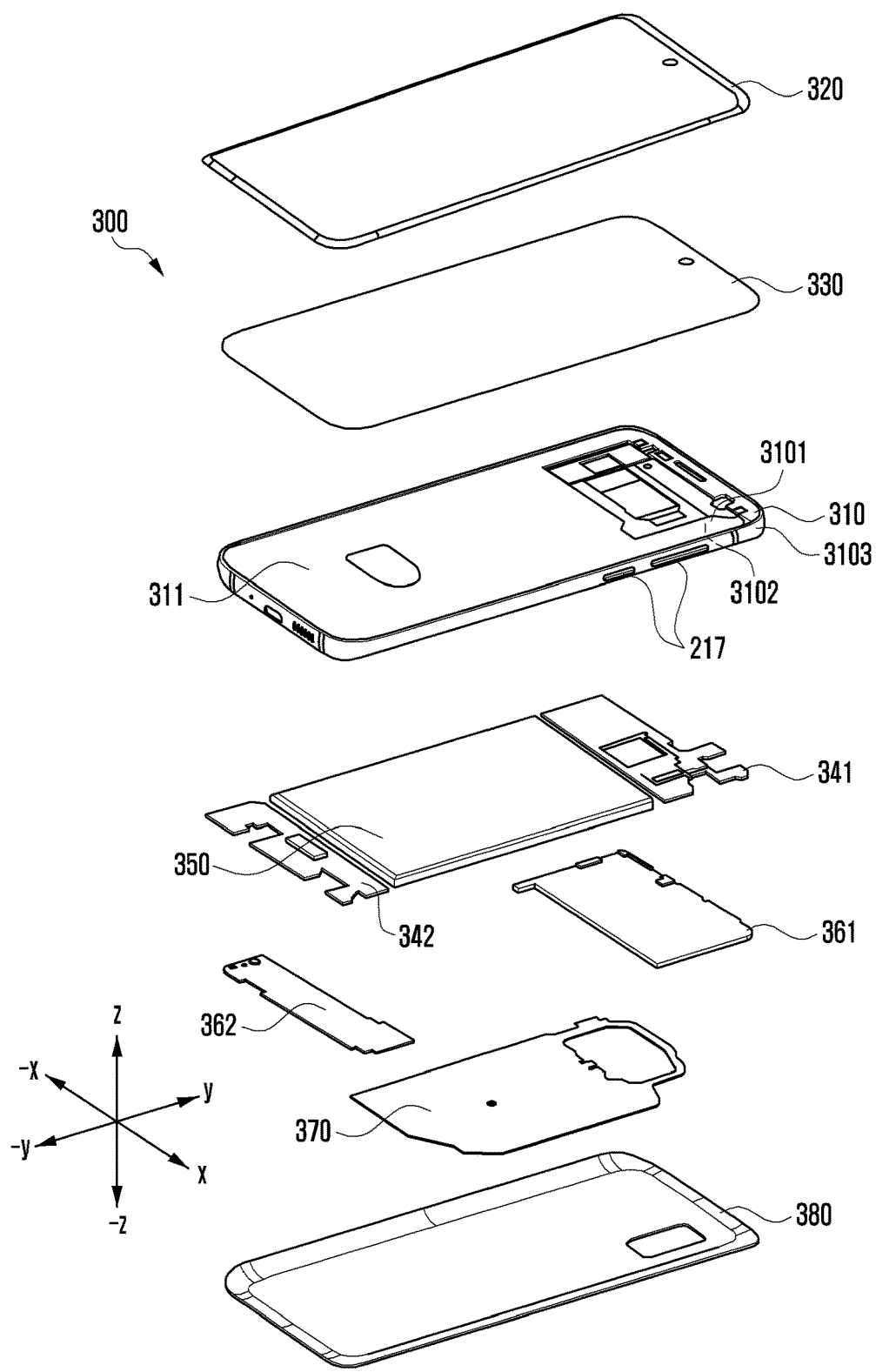
FIG. 3 is an exploded perspective view of an example electronic device according to various embodiments of the disclosure.

FIG. 3 is an exploded perspective view of an example electronic device according to various embodiments of the disclosure.

The electronic device 300 of FIG. 3 may be at least partially similar to the electronic device 101 of FIG. 1 and/or the electronic device 200 of FIGS. 2A and 2B, or may include various other embodiments of the electronic device.

With reference to FIG. 3, the electronic device 300 (e.g., electronic device 101 in FIG. 1 or electronic device 200 in FIGS. 2A and 2B) may include a side member 310 (e.g., side bezel structure 218 in FIG. 2A), a support member 311 (e.g., bracket or support structure), a front cover 320 (e.g., front plate 202 in FIG. 2A or first plate), a display 330 (e.g., display 201 in FIG. 2A), at least one board 341 and 342 (e.g., printed circuit board (PCB), flexible PCB (FPCB), or rigid-flexible PCB (R-FPCB)), a battery 350, at least one additional support member 361 and 362 (e.g., rear case or rear bracket), an antenna 370, and/or a rear cover 380 (e.g., rear plate 211 in FIG. 2B or second plate). In various embodiments, at least one of the components (e.g., support member 311 or at least one additional support member 361 and 362) may be omitted from the electronic device 300 or other components may be additionally included therein. At least one of the components of the electronic device 300 may be the same as or similar to at least one of the components of the electronic device 101 in FIG. 1 or the electronic device 200 in FIGS. 2A and 2B, and descriptions thereof will not be repeated below.

According to various embodiments, the side member 310 may include a first surface 3101 facing in a first direction (e.g., z-axis direction), a second surface 3102 facing in a direction opposite to the first surface 3101, and a side surface 3103 surrounding the space between the first surface 3101 and the second surface 3102. According to an embodiment, at least a portion of the side surface 3103 may be part of the external appearance of the electronic device 300. According to an embodiment, the support member 311 may be disposed in such a way that it extends from the side member 310 toward the internal space (e.g., internal space 4001 in FIG. 4A) of the electronic device 300. In an embodiment, the support member 311 may be disposed separately from the side member 310. According to an embodiment, the side member 310 and/or the support member 311 may be made of, for example, a metal material and/or a non-metal material (e.g., polymer). According to an embodiment, the support member 311 may be disposed to support at least a portion of the display 330 through the first surface 3101, and support at least some of the at least one board 341 and 342 and/or the battery 350 through the second surface 3102. According to an embodiment, the at least one board 341 and 342 may include a first board 341 (e.g., main board) disposed on one side with respect to the battery 350 in the internal space (e.g., internal space 4001 in FIG. 4A) of the electronic device 300, and a second board 342 (e.g., sub board) disposed on the other side. According to an embodiment, the first board 341 and/or the second board 342 may include a processor, a memory, and/or an interface. According to an embodiment, the processor may include one or more of, for example, a central processing unit, an application processor, a graphics processing unit, an image signal processor, a sensor hub processor, or a communication processor. According to an embodiment, the memory may include, for example, a volatile memory or a non-volatile memory. According to an embodiment, the interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/MMC connector, or an audio connector. According to an embodiment, the battery 350 is a device for supplying power to at least one component of the electronic device 300, and may include, for example, a non-rechargeable primary cell, a rechargeable secondary cell, or a fuel cell. At least some of the battery 350 may be disposed substantially on the same plane as, for example, the at least one board 341 and 342. According to an embodiment, the battery 350 may be disposed in a manner of being embedded in the electronic device 300. In a certain embodiment, the battery 350 may be disposed detachably from the electronic device 300.

According to various embodiments, the antenna 370 may be disposed between the rear cover 380 and the battery 350. According to an embodiment, the antenna 370 may include, for example, a near field communication (NFC) antenna, a wireless charging antenna, and/or a magnetic secure transmission (MST) antenna. The antenna 370 may perform short-range communication with, for example, an external device, or wirelessly transmit and receive power required for charging. In a certain embodiment, an antenna may be formed by parts of the side member 310 and/or the support member 311 or a combination thereof.

Figure 4:
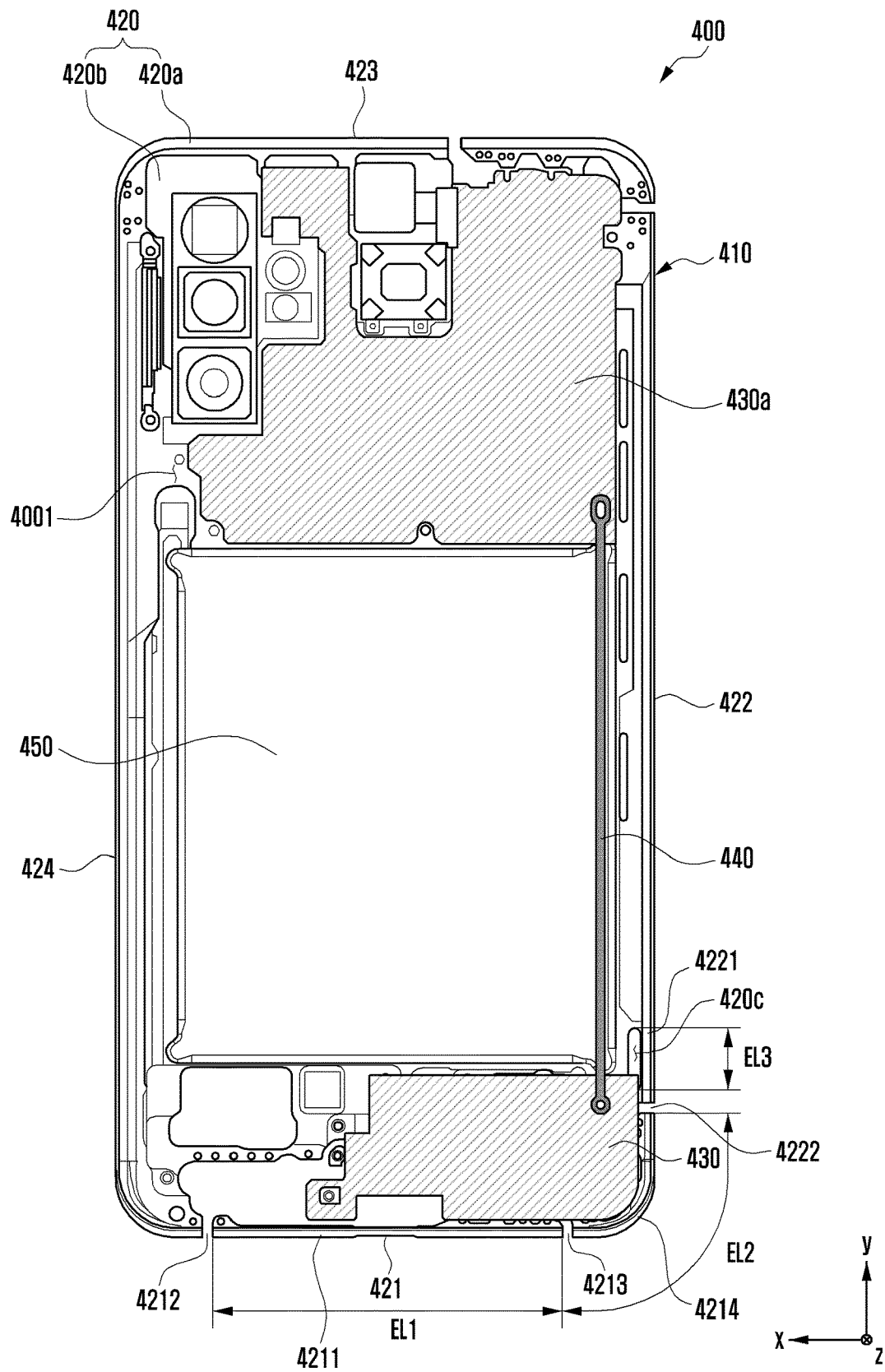
FIG. 4 is a configuration view of an example electronic device including an antenna according to various embodiments of the disclosure.

FIG. 4 is a configuration view of an electronic device including an antenna according to various embodiments of the disclosure.

The electronic device 400 of FIG. 4 may be at least partially similar to the electronic device 101 of FIG. 1, the electronic device 200 of FIGS. 2A and 2B or the electronic device 300 of FIG. 3, or may include other embodiments of the electronic device.

FIG. 4 is a configuration view looking at the rear surface (e.g., rear surface 210B in FIG. 2B) of the electronic device 400 with the rear cover (e.g., rear plate 211 in FIG. 2B) removed.

With reference to FIG. 4, the electronic device 400 may include a housing 410 (e.g., side member 210 in FIG. 2A that includes a front cover (e.g., front plate 202 in FIG. 2A), a rear cover (e.g., rear plate 211 in FIG. 2B) facing in a direction opposite to the front cover, and a side member 420 (e.g., side member 218 in FIG. 2A) surrounding the internal space 4001 between the front cover and the rear cover. According to an embodiment, the side member 420 may include a conductive member 420a (e.g., metal material) and a non-conductive member 420b (e.g., polymer material) coupled to the conductive member 420a. According to an embodiment, the conductive member 420a and the non-conductive member 420b may be coupled through injection or structurally coupled.

According to various embodiments, the side member 420 may include a first side surface 421 having a first length, a second side surface 422 extending in a vertical direction from the first side surface 421 and having a second length longer than the first length, a third side surface 423 extending in a direction parallel to the first side surface 421 from the second side surface 422 and having the first length, and a fourth side surface 424 extending in a direction parallel to the second side surface 422 from the third side surface 423 and having the second length.

According to various embodiments, the electronic device 400 may include a substrate 430 (e.g., first board or printed circuit board) disposed in the internal space 4001, and/or a sub-substrate 430a (e.g., second board or printed circuit board) spaced apart from the substrate 430. According to an embodiment, at least one wireless communication circuit (e.g., wireless communication module 192 in FIG. 1) may be disposed on the substrate 430. According to an embodiment, the electronic device 400 may include a battery 450 disposed between the substrate 430 and the sub-substrate 430a. According to an embodiment, the battery 450 may be disposed so as not to overlap the substrate 430 and/or the sub-substrate 430a. In an embodiment, the battery 450 may be disposed so as to at least partially overlap the substrate 430 and/or the sub-substrate 430a. According to an embodiment, the substrate 430 may be electrically connected to the sub-substrate 430a through an electrical connection member 440. According to an embodiment, the electrical connection member 440 may include an RF coaxial cable or a flexible printed circuit board (FPCB) type RF cable (FRC). According to an embodiment, the wireless communication circuit (e.g., wireless communication module 192 in FIG. 1) may be disposed on the substrate 430. In an embodiment, the wireless communication circuit (e.g., wireless communication module 192 in FIG. 1) may be disposed on the sub-substrate 430a and may be electrically connected to the substrate 430 through the electrical connection member 440.

According to various embodiments, the side member 420 may include conductive portions 4211, 4214 and 4221 segmented through non-conductive portions 4212, 4213 and 4222. For example, the electronic device 400 may include a first conductive portion 4211 segmented through a first non-conductive portion 4212 and a second non-conductive portion 4213 spaced apart from each other on at least some of the first side surface 421, a second conductive portion 4214 segmented through the second non-conductive portion 4213 and a third non-conductive portion 4222 disposed on the second side surface 422, and a third conductive portion 4221 segmented through the third non-conductive portion 4222 and disposed on the second side surface 422. According to an embodiment, the substrate 430 may be electrically connected to the wireless communication circuit (e.g., wireless communication module 192 in FIG. 1) at one or more points of the conductive portions 4211, 4214 and 4221 through an assembly process of being mounted in the internal space 4001 of the housing 410. For example, the first conductive portion 4211, the second conductive portion 4214, and the third conductive portion 4221 are electrically connected to the wireless communication circuit (e.g., wireless communication module 192 in FIG. 1), so that they can be used as an antenna radiator operating selectively or simultaneously in various frequency bands.

According to various embodiments, the first conductive portion 4211 may have a first length EL1 (e.g., first electrical length) through the first non-conductive portion 4212 and the second non-conductive portion 4213. According to an embodiment, the second conductive portion 4214 may have a second length EL2 (e.g., second electrical length) through the second non-conductive portion 4213 and the third non-conductive portion 4222. For example, the second length can be formed to be shorter than or equal to the first length. In an embodiment, the second length EL2 may be formed to be longer than or equal to the first length EL1. According to an embodiment, the first conductive portion 4211 and the second conductive portion 4214 are electrically connected, at various points, to the wireless communication circuit (e.g., wireless communication module 192 in FIG. 1), so that they can operate as an antenna in various frequency bands such as low band, mid band, high band, and nr (new radio) band.

According to various embodiments, the electronic device 400 may include a slit 420c having a third length EL3 (e.g., third electrical length) formed through the conductive member 420a disposed on at least some of the side member 420. According to an embodiment, the slit 420c may be formed to have a length in a direction parallel to the longitudinal direction (e.g., y-axis direction) of the second side surface 422 close or adjacent to the third non-conductive portion 4222 of the second side surface 422. As another example, the slit 420c may be connected to the third non-conductive portion 4222. According to an embodiment, the third non-conductive portion 4222 is electrically connected, close to the slit 420c, to the wireless communication circuit (e.g., wireless communication module 192 in FIG. 1), so that it can be used as an antenna operating in the nr band.

According to various embodiments of the disclosure, in the electronic device 400, the first conductive portion 4211, the second conductive portion 4214, and the third conductive portion 4221 disposed in a left-right asymmetric segmented structure based on the non-conductive portions 4212, 4213 and 4222 can be properly switched in various ways according to the state of the electronic device 400 (e.g., user's grip or operating frequency band for each service) through at least one switching circuit (e.g., switching element or tunable IC) disposed among electrical paths (e.g., wiring structures) connected to the wireless communication circuit (e.g., wireless communication module 192 in FIG. 1), which can help to reduce the degree of reduction in the antenna radiation performance.

Figure 5:
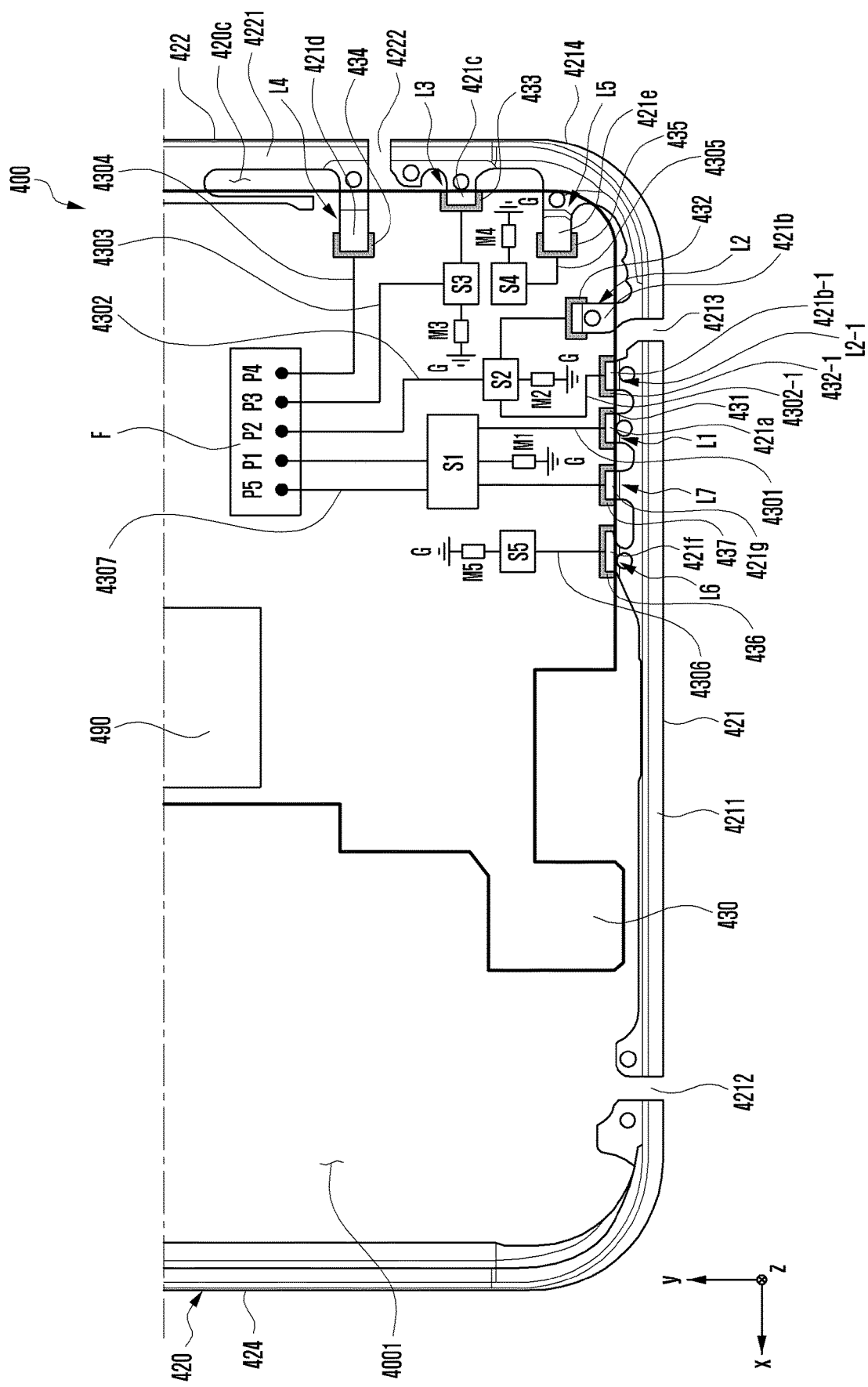
FIG. 5 is a view illustrating an arrangement structure of an example antenna according to various embodiments of the disclosure.

FIG. 5 is a view illustrating an arrangement structure of an example antenna according to various embodiments of the disclosure.

With reference to FIG. 5, the electronic device 400 may include a side member 420 including conductive portions 4211, 4214 and 4221 segmented through spaced-apart non-conductive portions 4212, 4213 and 4222. According to an embodiment, the non-conductive portions 4212, 4213 and 4222 may include a first non-conductive portion 4212 and a second non-conductive portion 4213 disposed spaced apart on at least some of the first side surface 421, and a third non-conductive portion 4222 formed on at least some of the second side surface 422. According to an embodiment, the conductive portions 4211, 4214 and 4221 may include a first conductive portion 4211 positioned between the first non-conductive portion 4212 and the second non-conductive portion 4213, a second conductive portion 4214 positioned between the second non-conductive portion 4213 and a third non-conductive portion 4222 disposed on the second side surface 422, and a third conductive portion 4221 segmented from the second conductive portion 4214 through the third non-conductive portion 4222 and disposed on the second side surface 422. According to an embodiment, the second conductive portion 4214 may be disposed at a corner section of the electronic device 400 that shares the first side surface 421 and the second side surface 422.

According to various embodiments, the side member 420 may include a first connection piece 421a extended at a first point L1 of the first conductive portion 4211 to the internal space 4001. According to an embodiment, the side member 420 may include a second connection piece 421b extended at a second point L2 of the second conductive portion 4214 to the internal space 4001. According to an embodiment, the side member 420 may include another (e.g., a second) first connection piece 421b-1 extended at another (e.g., a second) first point L2-1 between the first point L1 and the second non-conductive portion 4213 to the internal space 4001. According to an embodiment, the side member 420 may include a third connection piece 421c extended from the second conductive portion 4214 to the internal space 4001 at a third point L3 between the second point L2 and the third non-conductive portion 4222. According to an embodiment, the side member 420 may include a fourth connection piece 421d extended at a fourth point L4 of the third conductive portion 4221 to the internal space 4001. According to an embodiment, the fourth connection piece 421d may be disposed close to the slit 420c. According to an embodiment, the side member 420 may include a fifth connection piece 421e extended from the second conductive portion 4214 to the internal space 4001 at a fifth point L5 between the second point L2 and the third point L3. According to an embodiment, the side member 420 may include a sixth connection piece 421f extended from the first conductive portion 4211 to the internal space 4001 at a sixth point L6 between the first point L1 and the first non-conductive portion 4212. According to an embodiment, the side member 420 may include a seventh connection piece 421g extended from the first conductive portion 4211 to the internal space 4001 at a seventh point L7 between the first point L1 and the sixth point L6.

According to various embodiments, the electronic device 400 may include a substrate 430 including a ground (G). According to an embodiment, the substrate 430 may include a first connection portion 431 electrically connected to the first connection piece 421a, a second connection portion 432 electrically connected to the second connection piece 421b, another (or second) first connection portion 432-1 electrically connected to the other (second) first connection piece 421b-1, a third connection portion 433 electrically connected to the third connection piece 421c, a fourth connection portion 434 electrically connected to the fourth connection piece 421d, a fifth connection portion 435 electrically connected to the fifth connection piece 421e, a sixth connection portion 436 electrically connected to the sixth connection piece 421f, and/or a seventh connection portion 437 electrically connected to the seventh connection piece 421g. According to an embodiment, the connection portions 431, 432, 432-1, 433, 434, 435, 436 and 437 may be disposed on the substrate 430 and may include externally exposed conductive pads and/or conductive patterns. According to an embodiment, the connection pieces 421a, 421b, 421b-1, 421c, 421d, 421e, 421f and 421g may be physically and electrically connected to the connection portions 431, 432, 432-1, 433, 434, 435, 436 and 437 through structural bonding in which the substrate 430 is disposed in the internal space 4001 of the electronic device 400. In an embodiment, the connection pieces 421a, 421b, 421b-1, 421c, 421d, 421e, 421f and 421g may be electrically connected to the connection portions 431, 432, 432-1, 433, 434, 435, 436 and 437 through an electrical connection member such as a C-clip or conductive tape.

According to various embodiments, the electronic device 400 may include a wireless communication circuit F disposed on the substrate 430 and electrically connected to at least some of the connection portions 431, 432, 432-1, 433, 434, 435, 436 and 437. According to an embodiment, the wireless communication circuit F may include a plurality of ports P1, P2, P3, P4 and P5, and the ports P1, P2, P3, P4 and P5 may be selectively electrically connected to the corresponding connection portions 431, 432, 432-1, 433, 434 and 437, respectively.

According to various embodiments, the electronic device 400 may include a first switching circuit S1 disposed in a first electrical path 4301 connecting the first port P1 of the wireless communication circuit F and the first connection portion 431. According to an embodiment, the electronic device 400 may include a second switching circuit S2 disposed in a second electrical path 4302 electrically connecting the second port P2 of the wireless communication circuit F and the second connection portion 432. According to an embodiment, the second switching circuit S2 may be electrically connected to the other (second) first connection portion 432-1 through another (or second) first electrical path 4302-1. According to an embodiment, the second switching circuit S2 may electrically connect or disconnect the second connection portion 432 and the other (second) first connection portion 432-1 according to the control of the electronic device 400. According to an embodiment, the electronic device 400 may include a third switching circuit S3 disposed in a third electrical path 4303 electrically connecting the third port P3 of the wireless communication circuit F and the third connection portion 433. According to an embodiment, the fourth connection portion 434 may be electrically connected to the fourth port P4 of the wireless communication circuit F through a fourth electrical path 4304. According to an embodiment, the fifth connection portion 435 may be electrically connected to the ground G of the substrate 430 through a fifth electrical path 4305. According to an embodiment, the electronic device 400 may include a fourth switching circuit S4 disposed in the fifth electrical path 4305. According to an embodiment, the sixth connection portion 436 may be electrically connected to the ground G of the substrate 430 through a sixth electrical path 4306. According to an embodiment, the electronic device 400 may include a fifth switching circuit S5 disposed in the sixth electrical path 4306. According to an embodiment, the seventh connection portion 437 may be electrically connected to the fifth port P5 of the wireless communication circuit F through a seventh electrical path 4307 passing through the first switching circuit S1. According to an embodiment, the electrical paths 4301, 4302, 4302-1, 4303, 4304, 4305, 4306 and 4307 may include a wiring structure (e.g., trace) formed on the substrate 430. According to an embodiment, the switching circuits S1, S2, S3, S4 and S5 may be electrically connected to the ground G. According to an embodiment, the substrate 430 may include at least one matching circuit M1, M2, M3, M4 and M5 disposed in the electrical paths between the switching circuits S1, S2, S3, S4 and S5 and the ground G According to an embodiment, the at least one matching circuit M1, M2, M3, M4 and M5 may include at least one passive element (e.g., capacitor or inductor).

According to various embodiments, the first switching circuit S1 may include a switching element and/or a tunable IC controlled by the processor 490 (e.g., processor 120 in FIG. 1). According to an embodiment, when including a tunable IC, the first switching circuit S1, the second switching circuit S2, or the third switching circuit S3 may electrically connect the wireless communication circuit F and the first connection portion 431, second connection portion 432, the other (second) first connection portion 432-1, third connection portion 433 or seventh connection portion 433 among the first electrical path 4301, the second electrical path 4302, the other (second) first electrical path 4302-1, the third electrical path 4303 or the seventh electrical path 4307 through one of plural passive elements (e.g., capacitors or inductors) having different element values. In an embodiment, when including a switching element only, the first switching circuit S1, the second switching circuit S2 or the third switching circuit S3 may electrically disconnect the wireless communication circuit F and the first connection portion 431, second connection portion 432, the other (second) first connection portion 432-1, third connection portion 433, or seventh connection portion 437. According to an embodiment, the remaining switching circuits S4 and S5 may also electrically connect or electrically disconnect the ground G of the substrate 430 and the corresponding connection portions 435 and 436. In an embodiment, at least one of the remaining switching circuits S4 and S5 may also include a tunable IC including plural passive elements. In an embodiment, the seventh electrical path 4307, the seventh connection portion 437, and the seventh connection piece 421g may be omitted. In an embodiment, the first to fifth switching circuits S1 to S5 may include a switch or at least one passive element to operate as a matching circuit.

According to various embodiments, the first port P1 of the wireless communication circuit F may be electrically connected to the first point L1 of the first conductive portion 4211 through the first switching circuit S1 disposed in the first electrical path 4301. According to an embodiment, the second port P2 may be electrically connected to the second point L2 of the second conductive portion 4214 through the second electrical path 4302 and the second switching circuit S2. According to an embodiment, the third port P3 may be electrically connected to the third point L3 of the second conductive portion 4214 through the third switching circuit S3 disposed in the third electrical path 4303. Hence, at least some of the first conductive portion 4211 and at least some of the second conductive portion 4214 may function as at least one antenna operating in the low band, mid band, and/or high band through switching operations of the first switching circuit S1, the second switching circuit S2 and/or the third switching circuit S3. In this case, through the switching of the fourth switching circuit S4 disposed in the fifth electrical path 4305 and/or the fifth switching circuit S5 disposed in the sixth electrical path 4306, the fifth point L5 of the second conductive portion 4214 and/or the sixth point L6 of the first conductive portion 4211 may be connected to or disconnected from the ground G of the substrate 430, so that the operating frequency band of the at least one antenna may be variously adjusted.

According to various embodiments, the electronic device 400 may include at least one antenna operating in various bands (e.g., low band, mid band, high band, and/or nr band) by being electrically connected to or disconnected from the first conductive portion 4211, the second conductive portion 4214 and/or the third conductive portion 4221 through at least some of the plural switching circuits S1, S2, S3, S4 and S5. For example, the processor 490 (e.g., processor 120 in FIG. 1) of the electronic device 400 may control the switching circuits S1, S2, S3, S4 and S5 based on the status information of the electronic device 400 (e.g., user grip information and/or frequency band for each service) so as to achieve smooth radiation performance through the first conductive portion 4211, the second conductive portion 4214, and/or the third conductive portion 4221.

In the following description of the drawings, the low band may refer, for example, to a frequency band in a range of about 600 MHz to 960 MHz, the mid band may refer, for example, to a frequency band in a range of about 1700 MHz to 2200 MHz, the high band may refer, for example, to a frequency band in a range of about 2300 MHz to 2800 MHz, and the nr band may refer, for example, to a frequency band in a range of about 3 GHz to 300 GHz, particularly, about 3.2 GHz to 4.5 GHz.

Figure 6A:
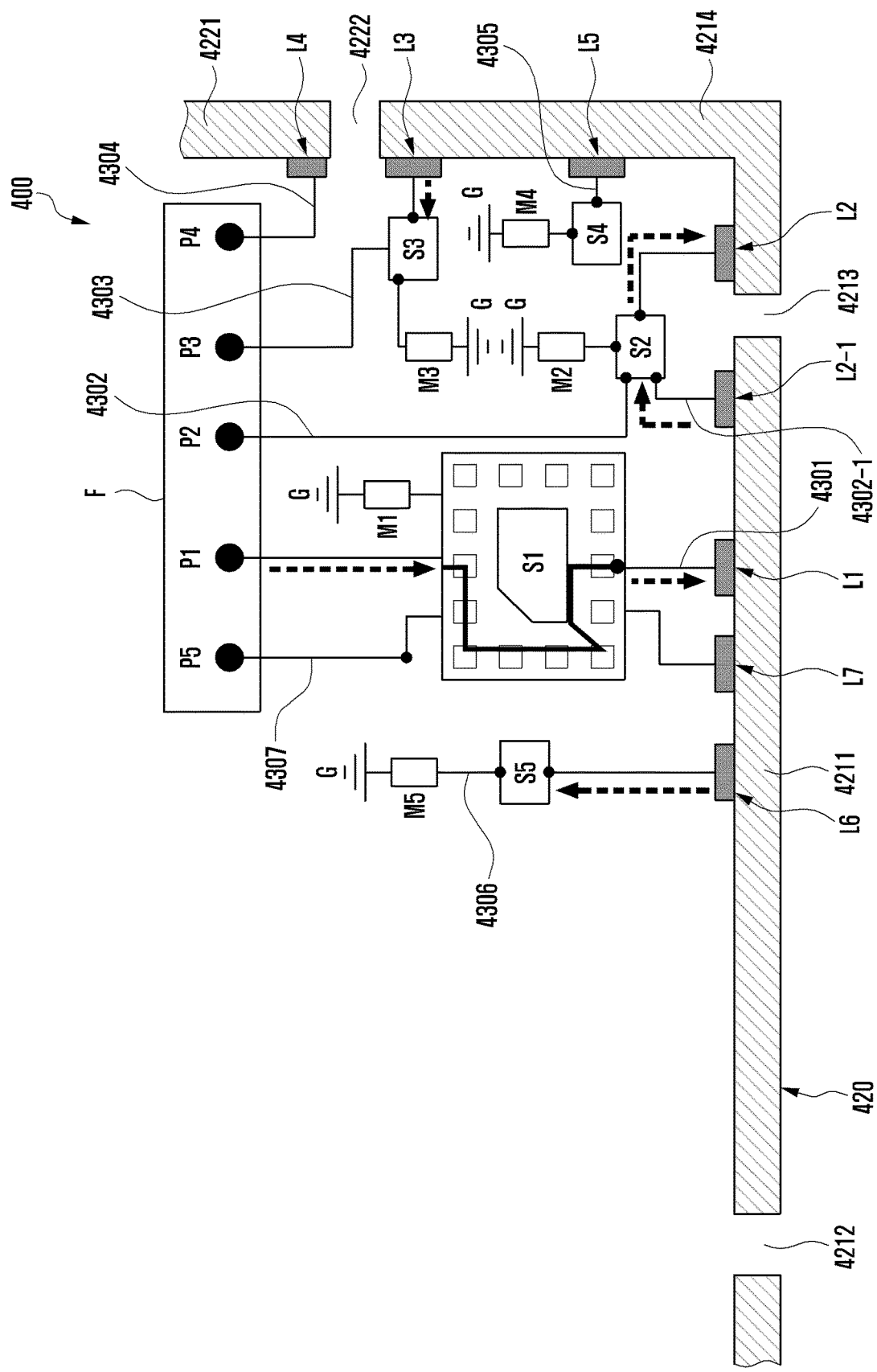
FIGS. 6A, 6B, and 6C are diagrams illustrating a current flow in an example antenna through feeding at a first point of a first conductive portion according to various embodiments of the disclosure.
Figure 6B:
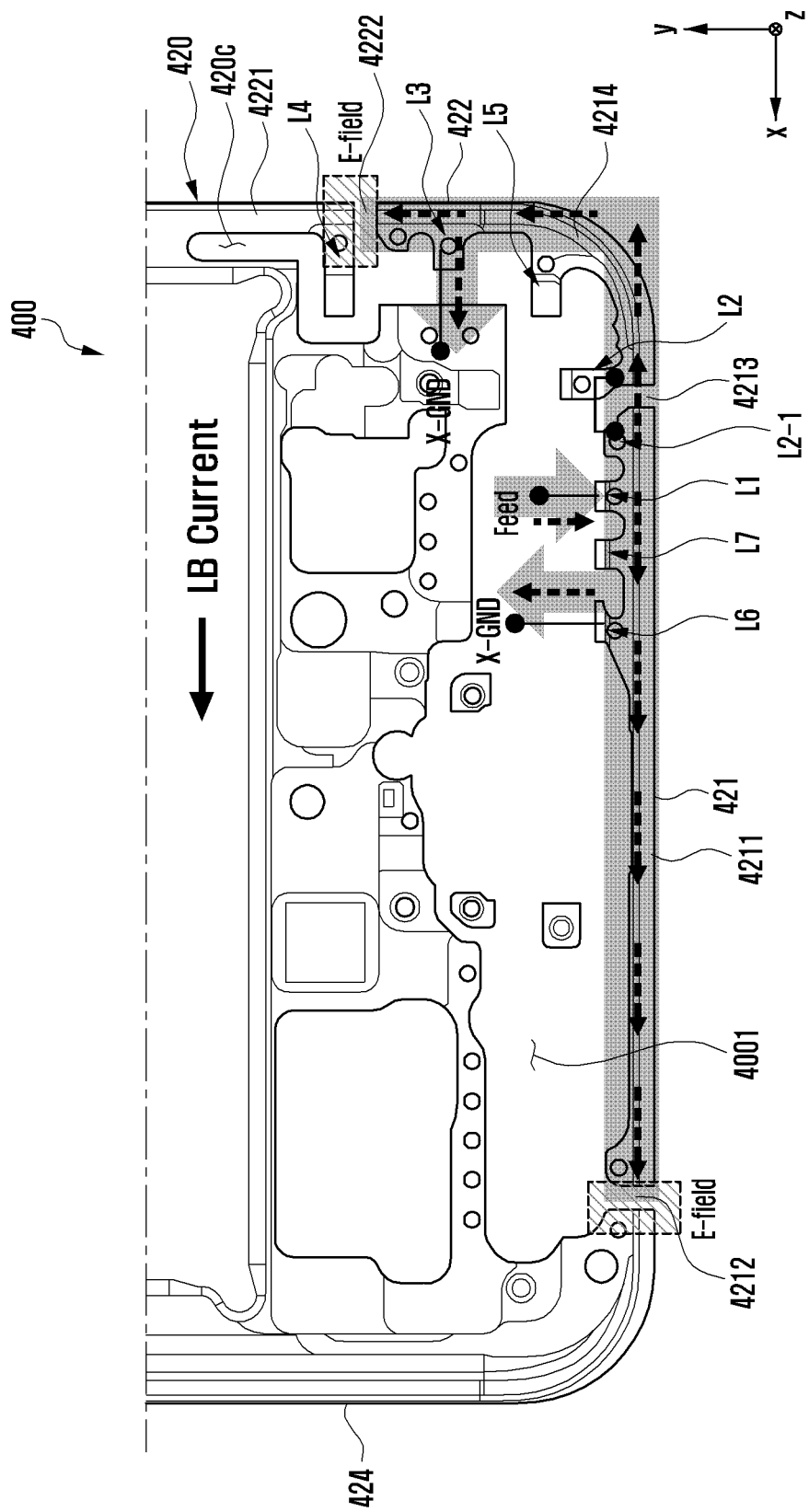
Figure 6C:
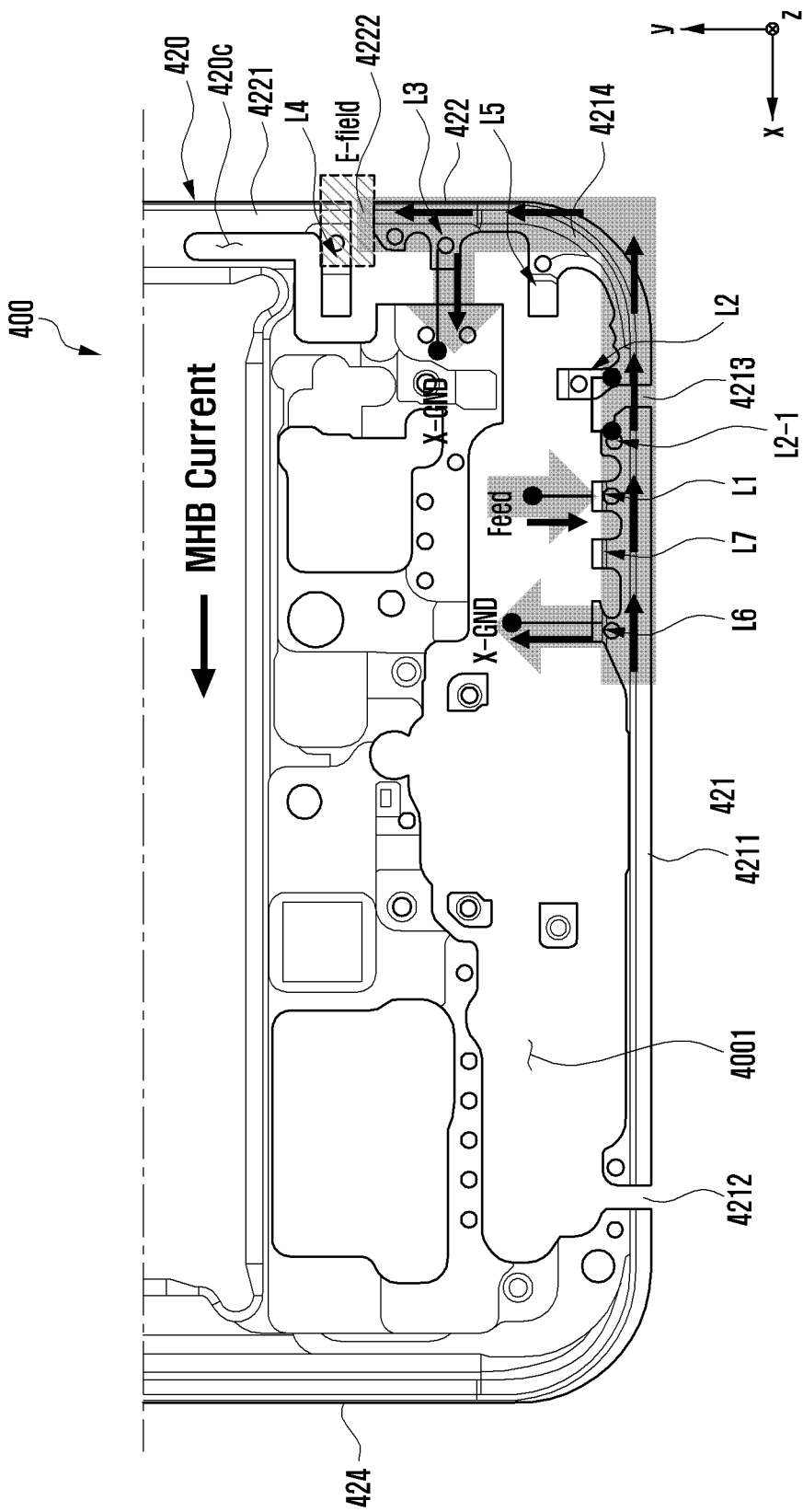

FIGS. 6A, 6B, and 6C are diagrams illustrating a current flow in an example antenna through feeding at a first point of the first conductive portion according to various embodiments of the disclosure.

With reference to FIGS. 6A, 6B, and 6C, the first port P1 of the wireless communication circuit F may be electrically connected to the first point L1 of the first conductive portion 4211 through the first switching circuit S1 disposed in the first electrical path 4301. According to an embodiment, the third point L3 of the second conductive portion 4214 may be connected to the ground G of the substrate 430 through the third switching circuit S3. According to an embodiment, the other (second) first point L2-1 of the first conductive portion 4211 and the second point L2 of the second conductive portion 4214 may remain in an electrically connected state through the second switching circuit S2. Hence, at least some of the first conductive portion 4211 and at least some of the second conductive portion 4214 may function as an antenna operating in the low band, mid band, and/or high band. In this case, the operating frequency band may be variously adjusted by connecting or disconnecting the fifth point L5 of the second conductive portion 4214 and/or the sixth point L6 of the first conductive portion 4211 to or from the ground G of the substrate 430 through the switching of the fourth switching circuit S4 disposed in the fifth electrical path 4305 and/or the fifth switching circuit S5 disposed in the sixth electrical path 4306.

According to various embodiments, the electronic device 400 may include, through the first electrical path 4301, an antenna having a current path formed from the first point L1 of the first conductive portion 4211 electrically connected to the first port P1 of the wireless communication circuit F to the first non-conductive portion 4212. In this case, an E-field may be formed at the first non-conductive portion 4212, and the antenna may operate in the low band.

According to various embodiments, the electronic device 400 may include, through the first electrical path 4301, an antenna having a current path formed from the first point L1 of the first conductive portion 4211 electrically connected to the first port P1 of the wireless communication circuit F to the third non-conductive portion 4222. According to an embodiment, the second point L2 of the second conductive portion 4214 and the other (second) first point L2-1 of the first conductive portion 4211 may remain in an electrically connected state through the second switching circuit S2. In this case, an E-field is formed at the third non-conductive portion 4222, and the antenna may operate in the mid band or high band.

According to various embodiments, the electronic device 400 may include, through the first electrical path 4301, an antenna having a current path formed from the first point L1 of the first conductive portion 4211 electrically connected to the first port P1 of the wireless communication circuit F via the sixth point L6 to the ground G of the substrate 430. In this case, the antenna may operate in the mid band or high band.

Figure 7A:
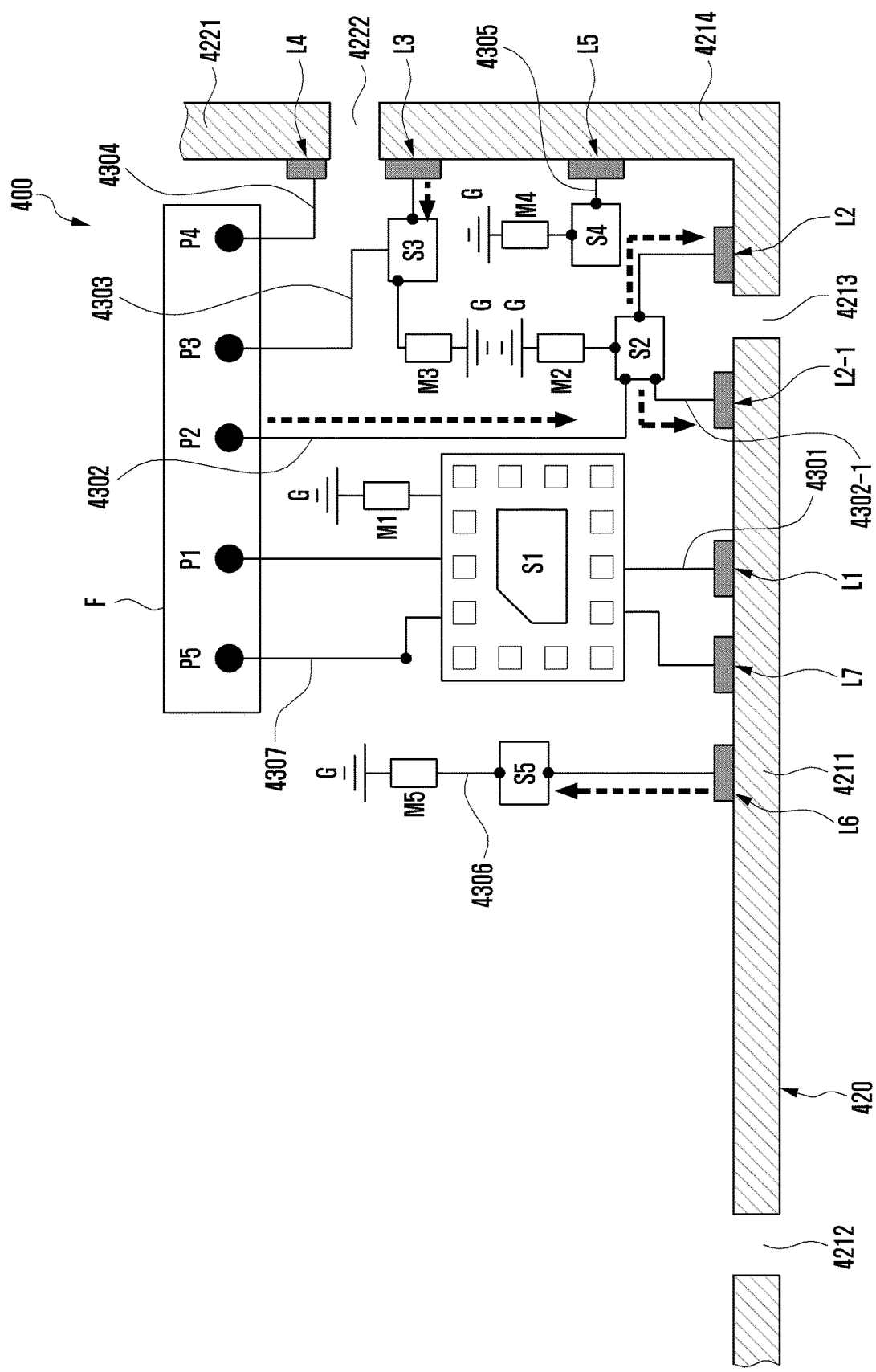
FIGS. 7A, 7B, and 7C are diagrams illustrating a current flow in an example antenna through feeding at a second point of a second conductive portion according to various embodiments of the disclosure.
Figure 7B:
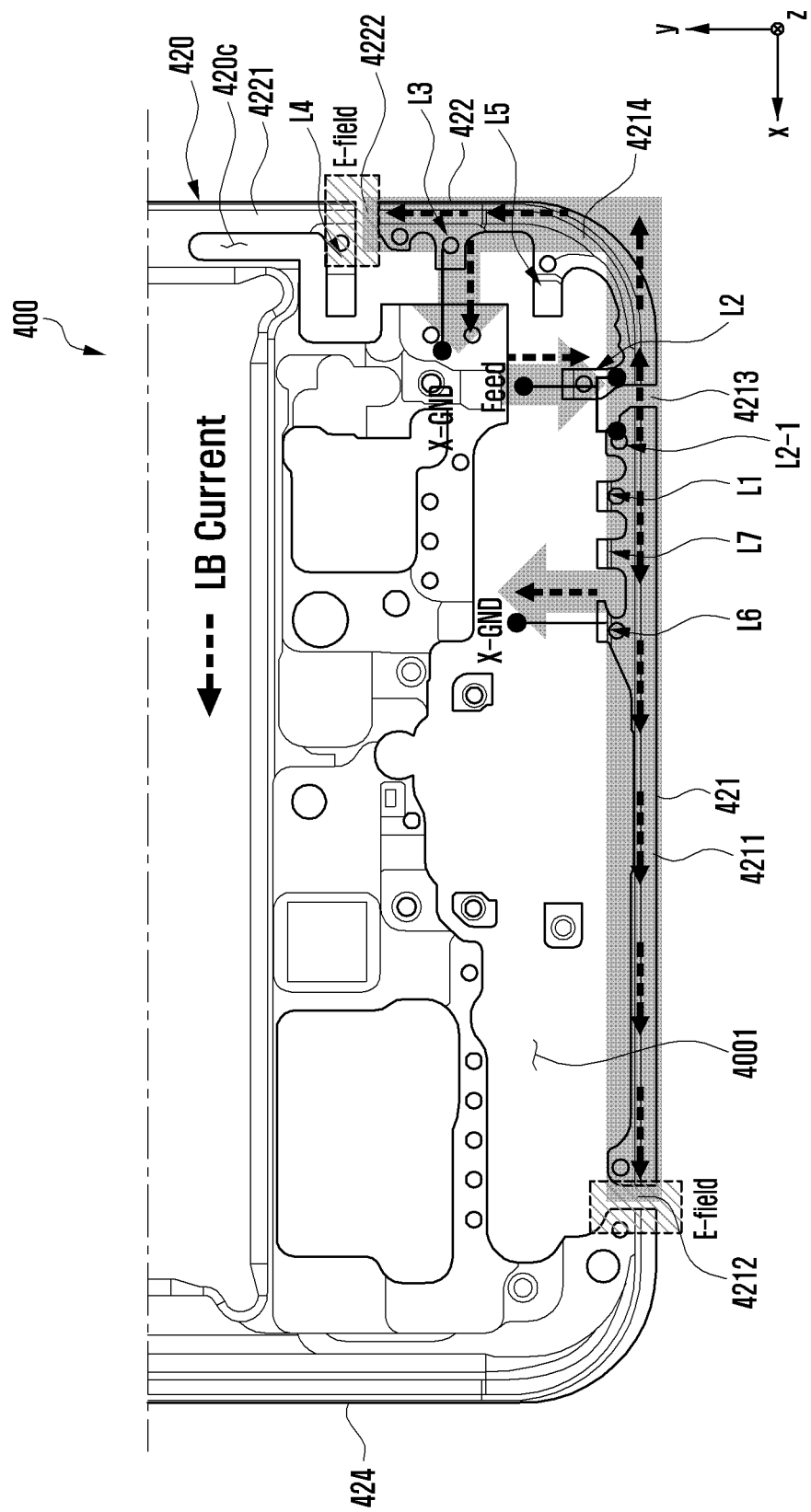
Figure 7C:
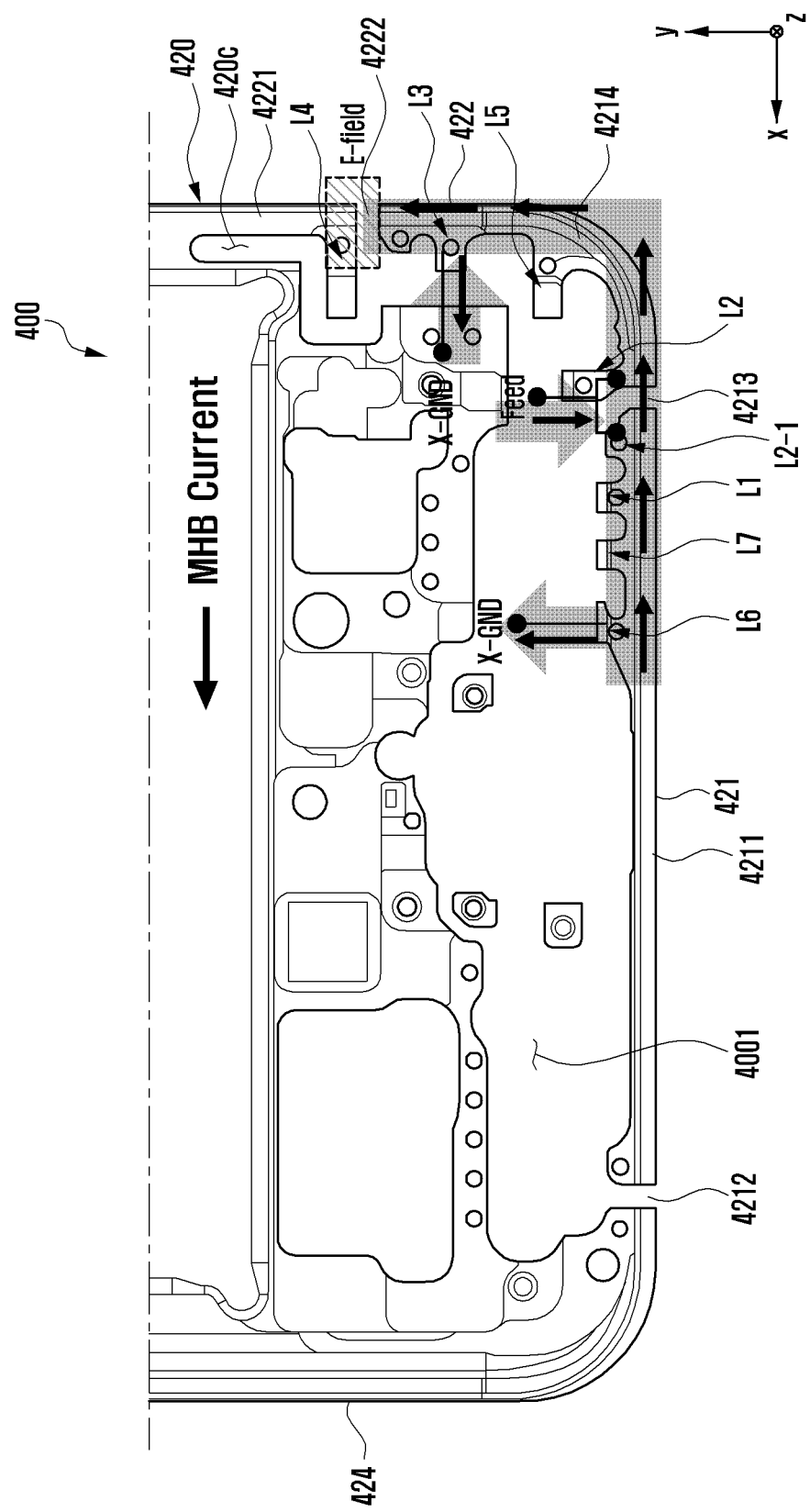

FIGS. 7A, 7B, and 7C are diagrams illustrating a current flow in an example antenna through feeding at a second point of the second conductive portion according to various embodiments of the disclosure.

With reference to FIGS. 7A, 7B, and 7C, the second port P2 of the wireless communication circuit F may be electrically connected to the second point L2 of the second conductive member 4214 through the second switching circuit S2 disposed in the second conductive path 4302. According to an embodiment, the second point L2 may be electrically connected to the other (second) first point L2-1 through the second-first electrical path 4302-1 and the second switching circuit S1. According to an embodiment, the third point L3 of the second conductive portion 4214 may remain in a state of being connected to the ground G of the substrate 430 through the third switching circuit S3. Hence, at least some of the first conductive portion 4211 and at least some of the second conductive portion 4214 may function as an antenna operating in the low band, mid band, and/or high band. In this case, the operating frequency band may be variously adjusted by connecting or disconnecting the fifth point L5 of the second conductive portion 4214 and/or the sixth point L6 of the first conductive portion 4211 to or from the ground G of the substrate 430 through the switching of the fourth switching circuit S4 disposed in the fifth electrical path 4305 and/or the fifth switching circuit S5 disposed in the sixth electrical path 4306.

According to various embodiments, the electronic device 400 may include, through the second electrical path 4302, an antenna having a current path formed from the second point L2 of the second conductive portion 4214 electrically connected to the second port P2 of the wireless communication circuit F to the first non-conductive portion 4212. In this case, an E-field may be formed at the first non-conductive portion 4212 and the antenna may operate in the low band.

According to various embodiments, the electronic device 400 may include, through the second electrical path 4302, an antenna having a current path formed from the second point L2 of the second conductive portion 4214 electrically connected to the second port P2 of the wireless communication circuit F to the third non-conductive portion 4222. According to an embodiment, the second point L2 of the second conductive portion 4214 and the other (second) first point L2-1 of the first conductive portion 4211 may remain in an electrically connected state through the second switching circuit S2. In this case, an E-field may be formed at the third non-conductive portion 4222, and the antenna may operate in the mid band or high band.

According to various embodiments, the electronic device 400 may include, through the second electrical path 4302, an antenna having a current path formed from the second point L2 of the second conductive portion 4214 electrically connected to the second port P2 of the wireless communication circuit F via the sixth point L6 to the ground G of the substrate 430. In this case, the antenna may operate in the mid band or high band.

Figure 8A:
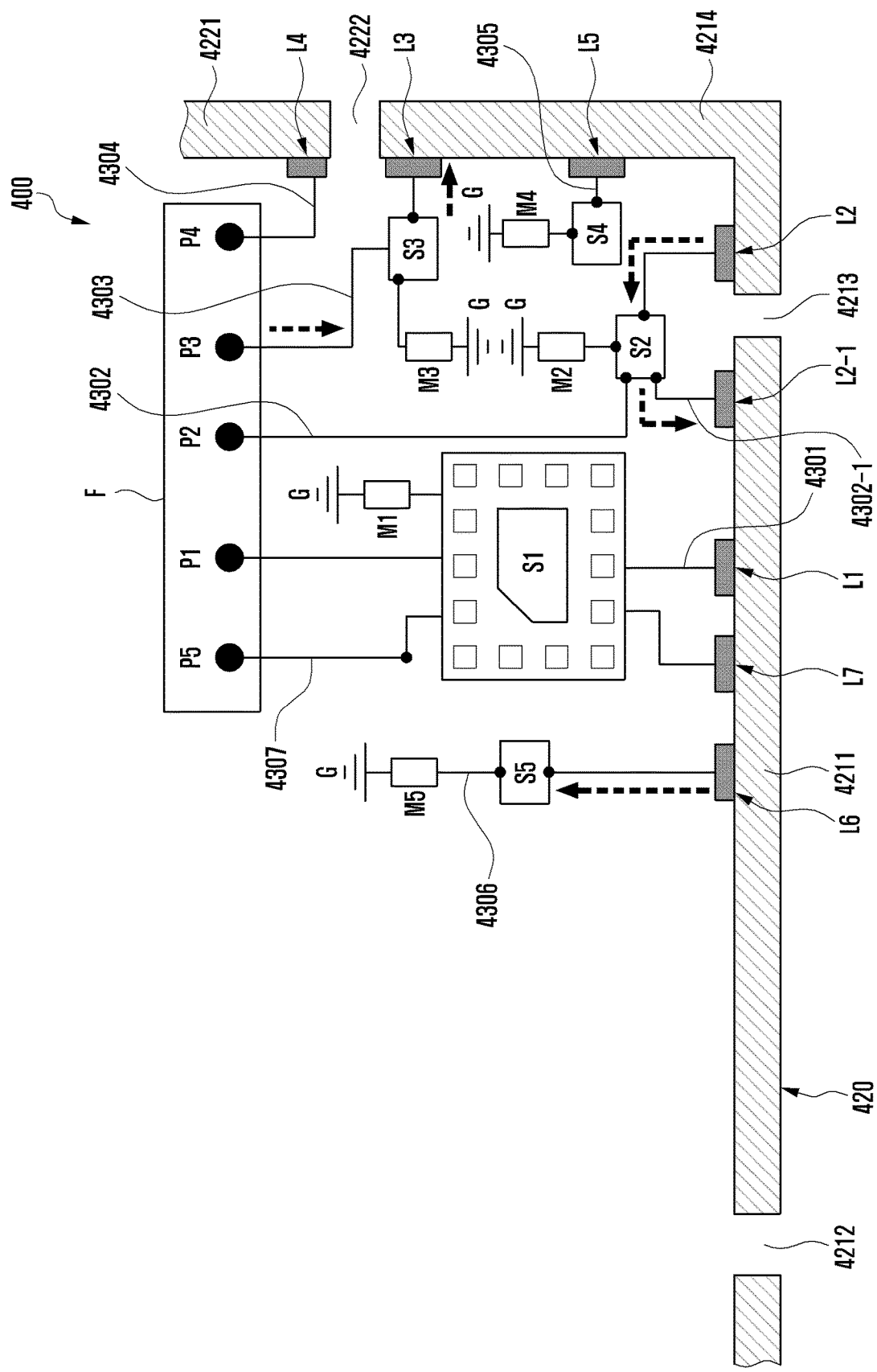
FIGS. 8A, 8B, and 8C are diagrams illustrating a current flow in an example antenna through feeding at a third point of the second conductive portion according to various embodiments of the disclosure.
Figure 8B:
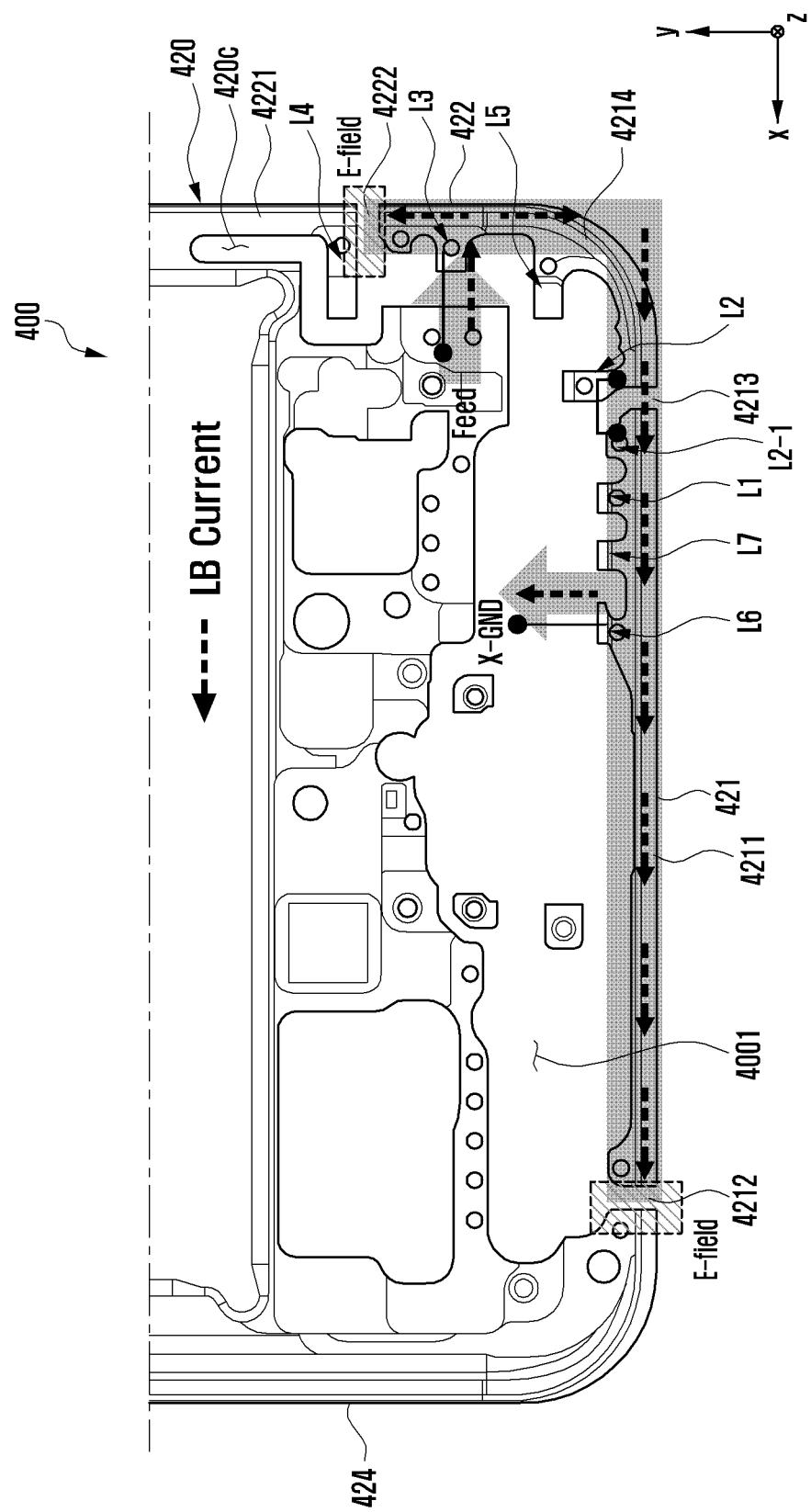
Figure 8C:
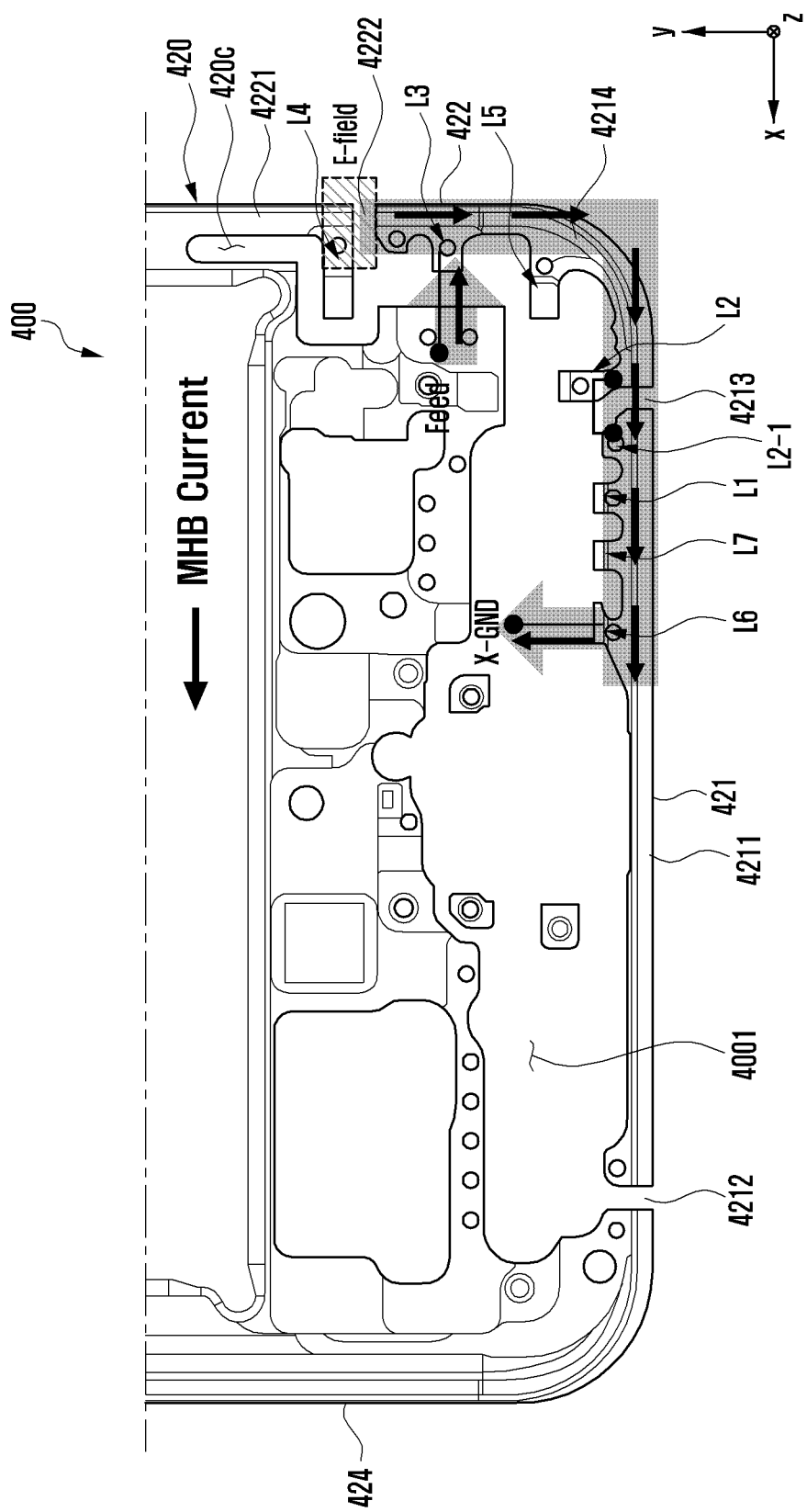

FIGS. 8A, 8B, and 8C are diagrams illustrating a current flow in the antenna through feeding at a third point of the second conductive portion according to various embodiments of the disclosure.

With reference to FIGS. 8A, 8B, and 8C, the third port P3 of the wireless communication circuit F may be electrically connected to the third point L3 of the second conductive portion 4214 through the third switching circuit S3 disposed in the third electrical path 4303. In this case, the first conductive portion 4211 may remain in a state of being electrically connected to the second conductive portion 4214 through the second switching circuit S2. Hence, at least some of the first conductive portion 4211 and at least some of the second conductive portion 4214 may function as an antenna operating in the low band, mid band, and/or high band. In this case, the operating frequency band may be variously adjusted by connecting or disconnecting the sixth point L6 of the first conductive portion 4211 to or from the ground G of the substrate 430 through switching of the fifth switching circuit S5 disposed in the sixth electrical path 4306.

According to various embodiments, the electronic device 400 may include, through the third electrical path 4303, an antenna having a current path formed from the third point L3 of the second conductive portion 4214 electrically connected to the third port P3 of the wireless communication circuit F to the first non-conductive portion 4212. In this case, an E-field may be formed at the first non-conductive portion 4212, and the antenna may operate in the low band.

According to various embodiments, the electronic device 400 may include, through the third electrical path 4303, an antenna having a current path formed from the third point L3 of the second conductive portion 4214 electrically connected to the third port P3 of the wireless communication circuit F via the sixth point L6 to the ground G of the substrate 430. According to an embodiment, the second point L2 of the second conductive portion 4214 and the other (second) first point L2-1 of the first conductive portion 4211 may remain in a state of being electrically connected through the second switching circuit S2. In this case, the antenna may operate in the mid band.

According to various embodiments, the electronic device 400 may include, through the third electrical path 4303, an antenna having a current path formed from the third point L3 of the second conductive portion 4214 electrically connected to the third port P3 of the wireless communication circuit F to the third non-conductive portion 4222. In this case, an E-field may be formed at the third non-conductive portion 4222, and the antenna may operate in the high band.

Figure 9A:
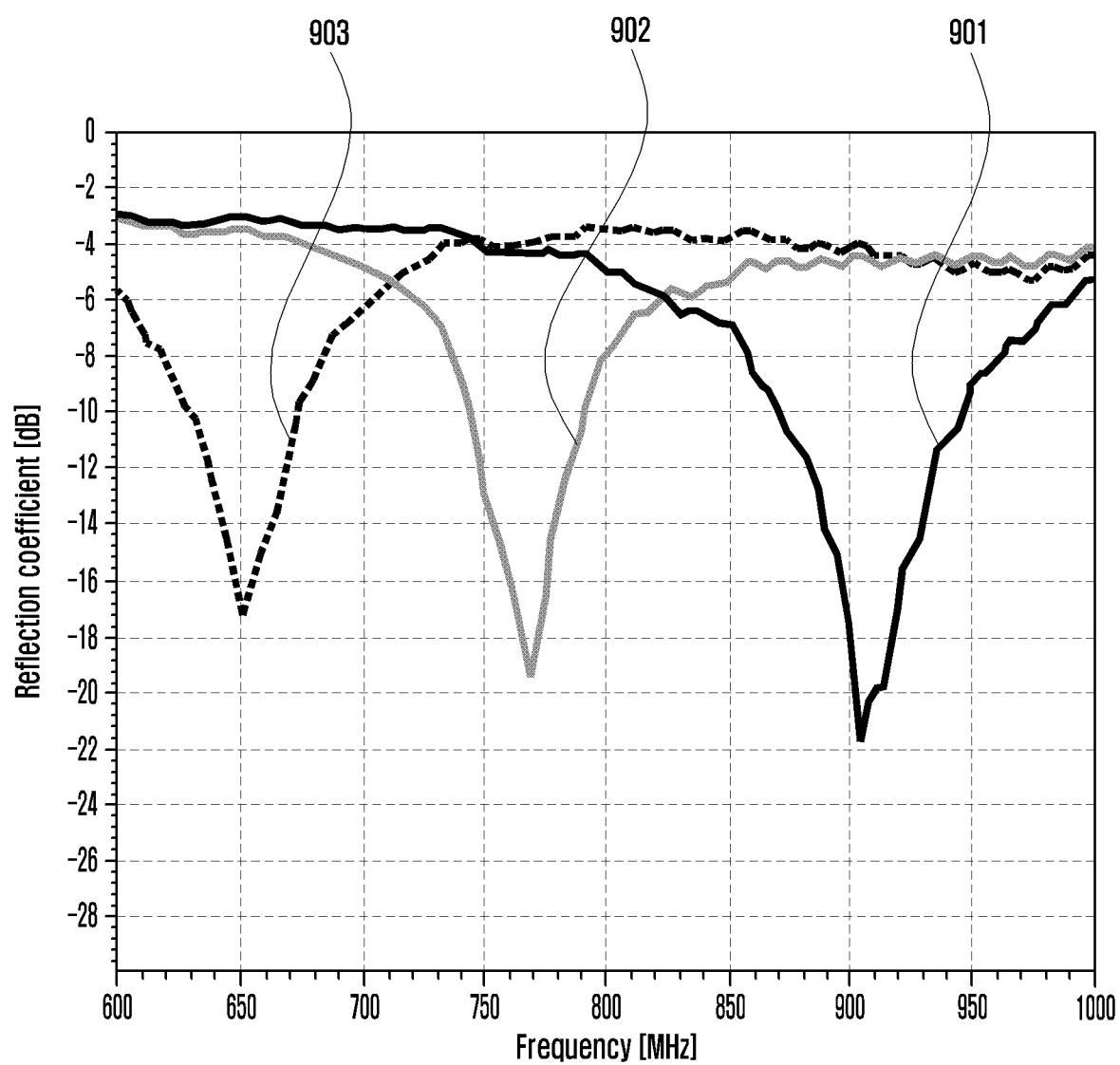
FIG. 9A shows graphs comparing operating frequency bands of an example antenna in the low band when feeding at a first point, a second point, and a third point according to various embodiments of the disclosure.

FIG. 9A shows graphs comparing operating frequency bands in the low band when feeding at a first point, a second point, and a third point according to various embodiments of the disclosure.

With reference to FIG. 9A, it can be seen that, in the low band, when fed through the first point L1 of the first conductive portion 4211 (e.g., case of FIG. 6B), the antenna operates in a first frequency band (about 900 MHz) (graph 901); when fed through the second point L2 of the second conductive portion 4214 (e.g., case of FIG. 7B), the antenna operates in a second frequency band (about 770 MHz) lower than the first frequency band (graph 902); when fed through the third point L3 of the second conductive portion 4214 (e.g., case of FIG. 8B), the antenna operates in a third frequency band (about 650 MHz) lower than the second frequency band (graph 903). For example, it can be seen even in the low band that the antenna is shifted to operate in various operating frequency bands according to the feeding point of first point L1, second point L2, and third point L3. Thus, controlling the switching operation of the switching circuits S1, S2, S3, S4 and S5 can help to set up an efficient operating frequency band even in the low band.

Figure 9B:
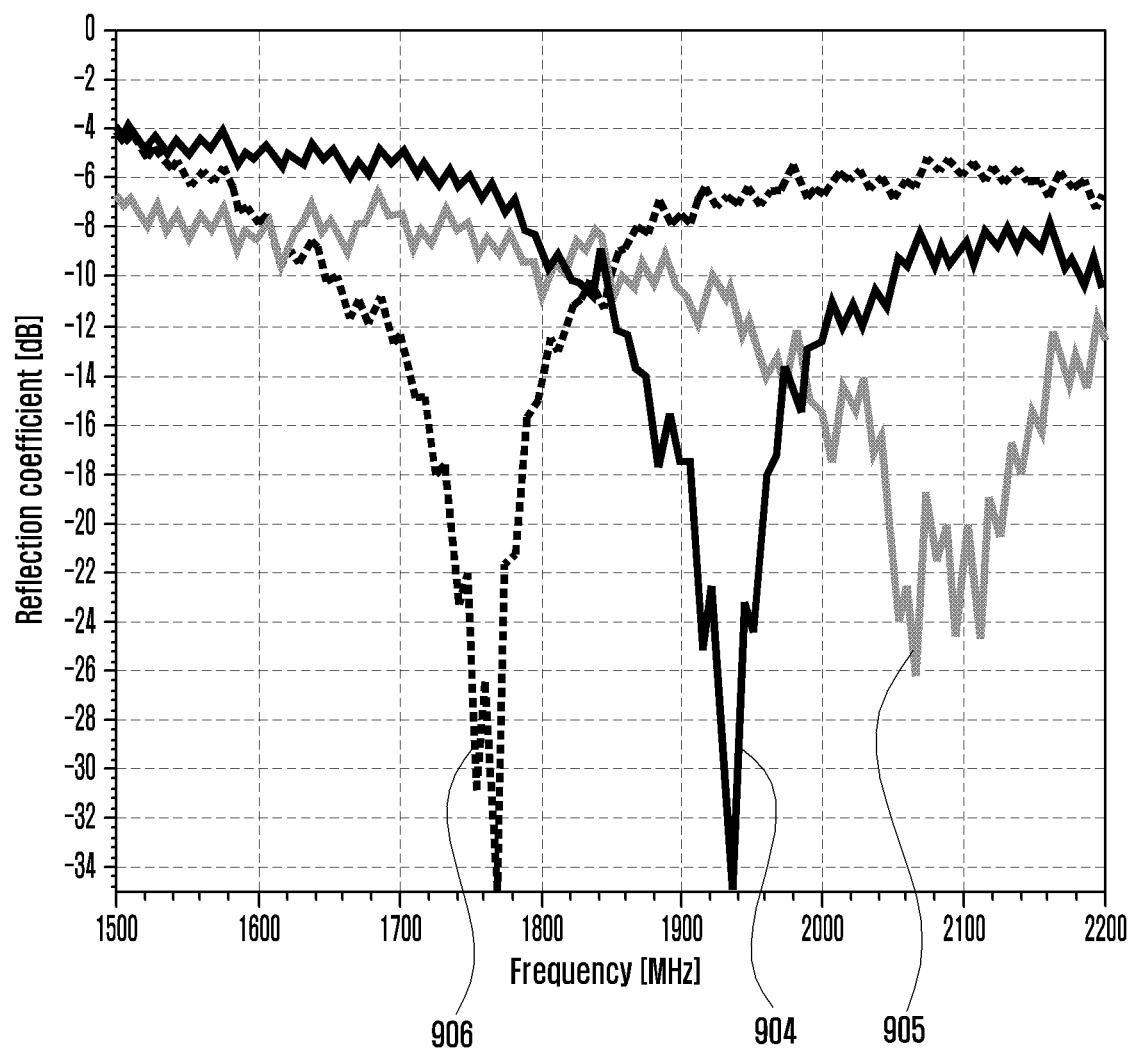
FIG. 9B shows graphs comparing operating frequency bands of an example antenna in the mid band when feeding at a first point, a second point, and a third point according to various embodiments of the disclosure.

FIG. 9B shows graphs comparing operating frequency bands in the mid band when feeding at a first point, a second point, and a third point according to various embodiments of the disclosure.

With reference to FIG. 9B, it can be seen that, in the mid band, when fed through the first point L1 of the first conductive portion 4211 (e.g., case of FIG. 6C), the antenna operates in a first frequency band (about 1940 MHz) (graph 904); when fed through the second point L2 of the second conductive portion 4214 (e.g., case of FIG. 7C), the antenna operates in a second frequency band (about 2100 MHz) higher than the first frequency band (graph 905); and when fed through the third point L3 of the second conductive portion 4214 (e.g., case of FIG. 8C), the antenna operates in a third frequency band (about 1760 MHz) lower than the first frequency band (graph 906). For example, it can be seen even in the mid band that the antenna is shifted to operate in various operating frequency bands according to the feeding point of first point L1, second point L2, and third point L3. Thus, controlling the switching operation of the switching circuits S1, S2, S3, S4 and S5 can help to set up an efficient operating frequency band even in the mid band.

Figure 9C:
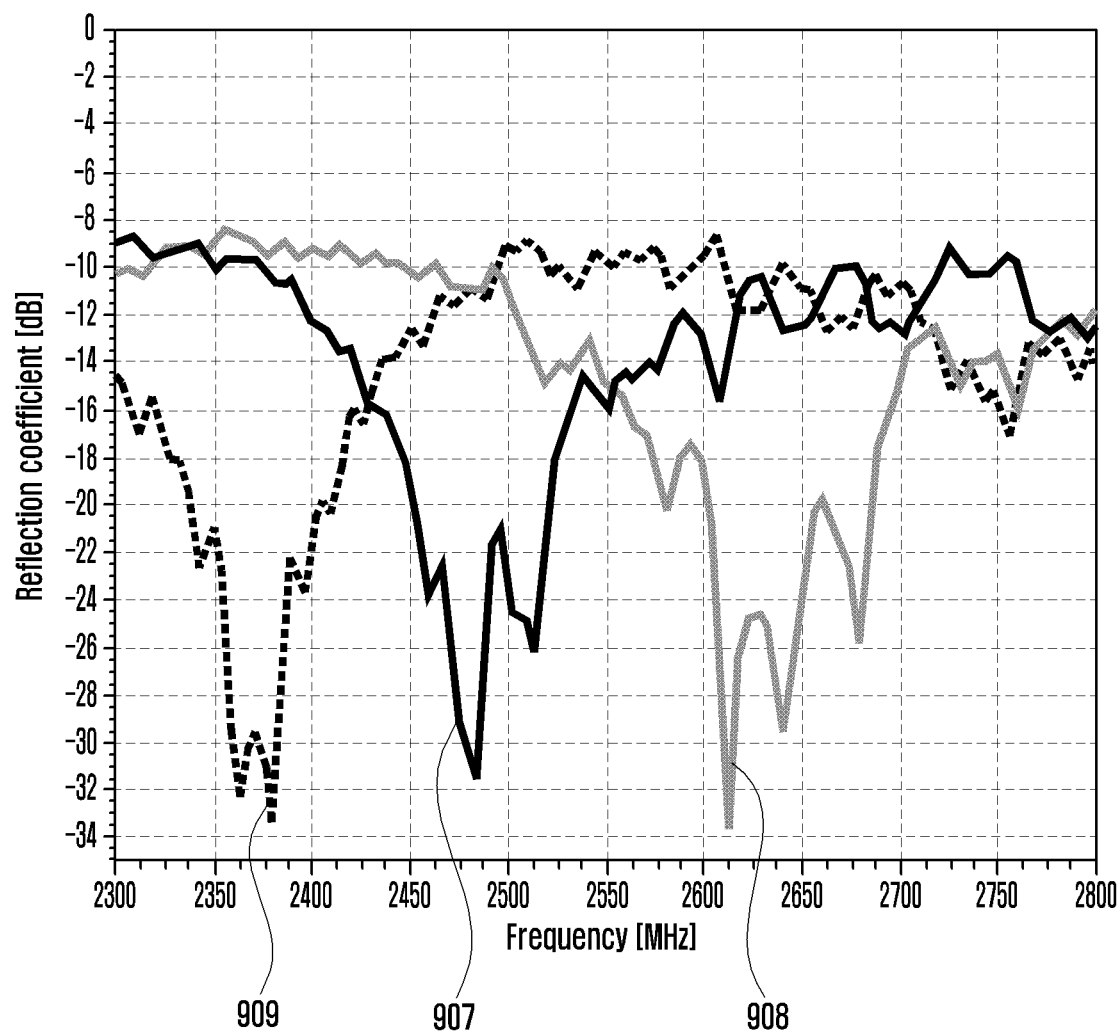
FIG. 9C shows graphs comparing operating frequency bands of an example antenna in the high band when feeding at a first point, a second point, and a third point according to various embodiments of the disclosure.

FIG. 9C shows graphs comparing operating frequency bands in the high band when feeding at a first point, a second point, and a third point according to various embodiments of the disclosure.

With reference to FIG. 9C, it can be seen that, in the high band, when fed through the first point L1 of the first conductive portion 4211 (e.g., case of FIG. 6C), the antenna operates in a first frequency band (about 2490 MHz) (graph 907); when fed through the second point L2 of the second conductive portion 4214 (e.g., case of FIG. 7C), the antenna operates in a second frequency band (about 2610 MHz) higher than the first frequency band (graph 908); and when fed through the third point L3 of the second conductive portion 4214 (e.g., case of FIG. 8C), the antenna operates in a third frequency band (about 2370 MHz) lower than the first frequency band (graph 909). For example, it can be seen even in the high band that the antenna is shifted to operate in various operating frequency bands according to the feeding point of first point L1, second point L2, and third point L3. Thus, controlling the switching operation of the switching circuits S1, S2, S3, S4 and S5 can help to set up an efficient operating frequency band even in the mid band.

FIGS. 10A, 10B, 11A, and 11B are diagrams illustrating a current flow in an example antenna when feeding at a second point and a third point according to various embodiments of the disclosure.

Figure 10A:
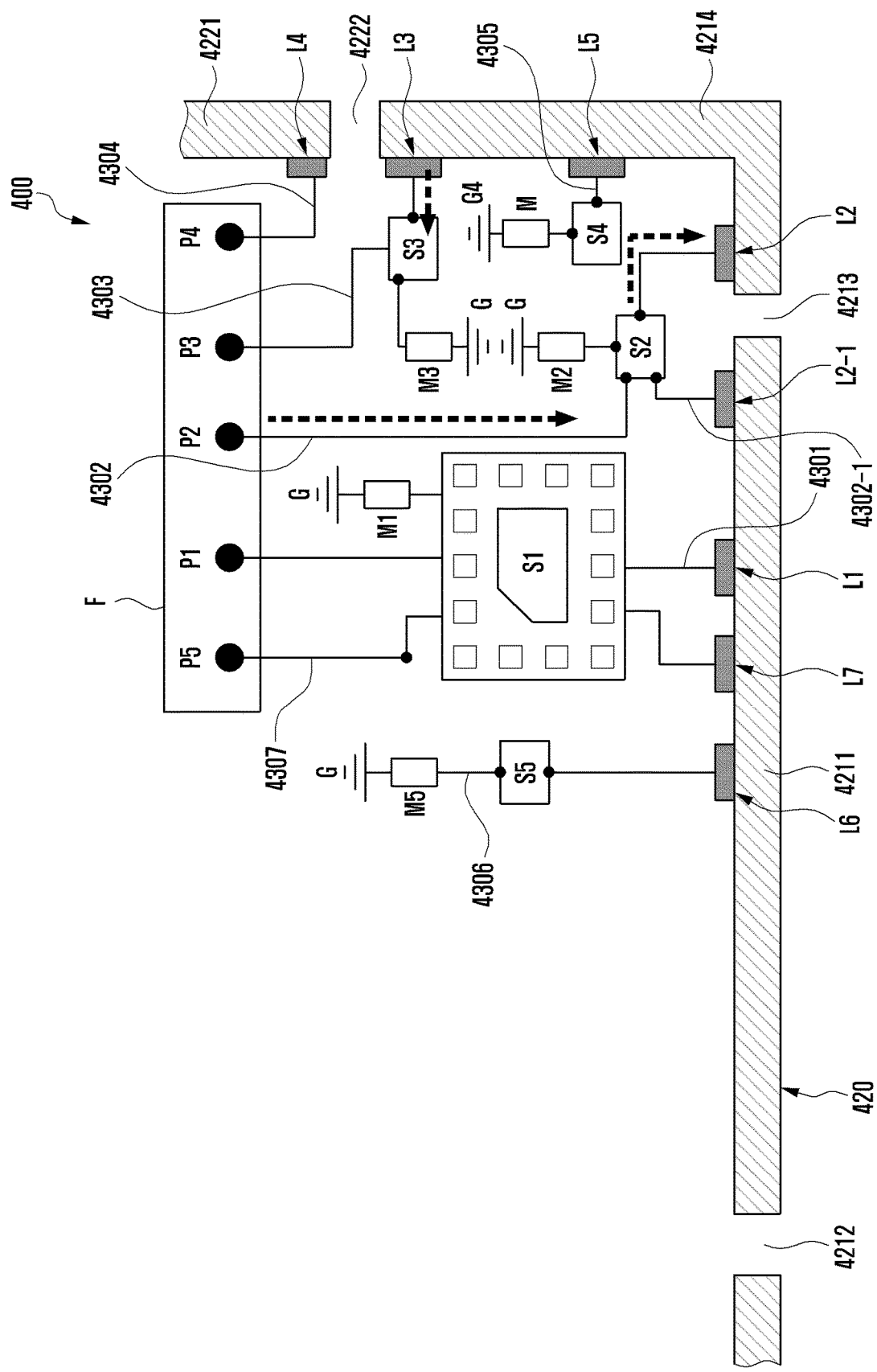
FIGS. 10A, 10B, 11A, and 11B are diagrams illustrating a current flow in an example antenna when feeding at a second point and a third point according to various embodiments of the disclosure.
Figure 10B:
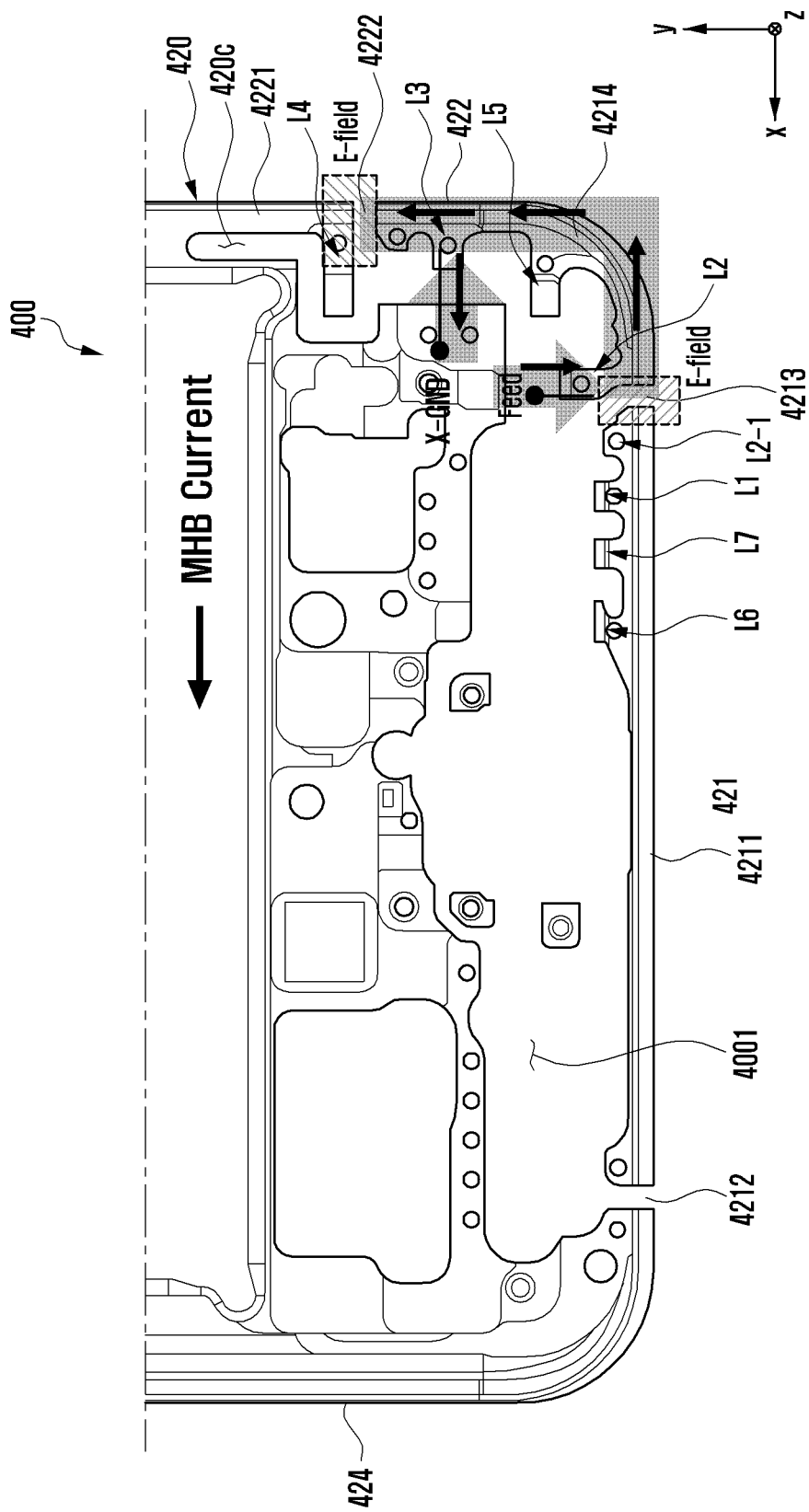

With reference to FIGS. 10A and 10B, the second port P2 of the wireless communication circuit F may be electrically connected to the second point L2 of the second conductive member 4214 through the second switching circuit S2 disposed in the second electrical path 4302. In this case, the other (second) first point L2-1 of the first conductive portion 4211 may be electrically disconnected from the second point L2 of the second conductive portion 4214 through the second switching circuit S2. According to an embodiment, the third point L3 of the second conductive portion 4214 may remain in a state of being connected to the ground G of the substrate 430 through the third switching circuit S3. Hence, an E-field may be formed at the second non-conductive portion 4213 and the third non-conductive portion 4222, and at least some of the second conductive portion 4214 may function as an antenna operating in the mid band and/or high band.

Figure 11A:
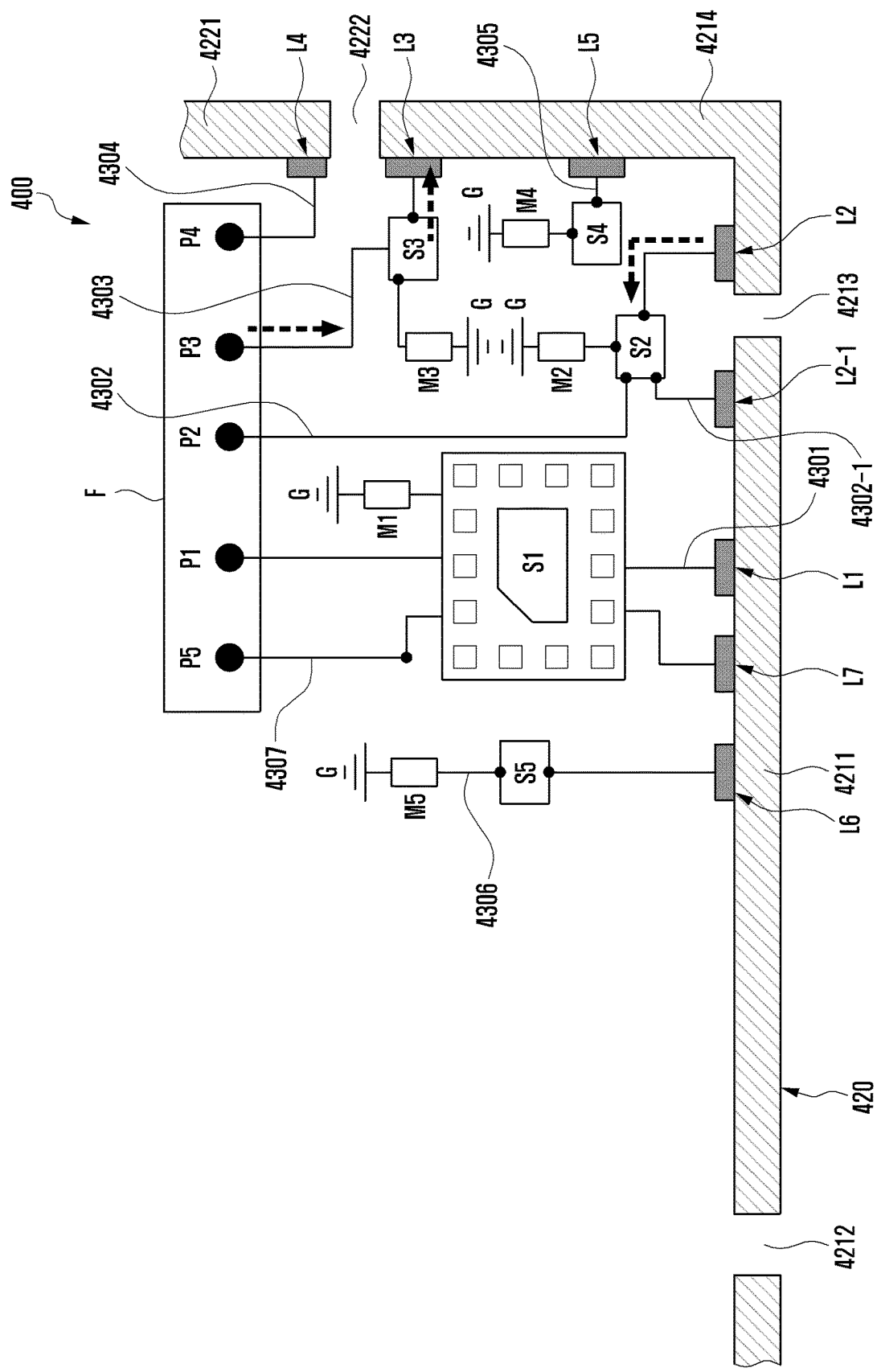
Figure 11B:
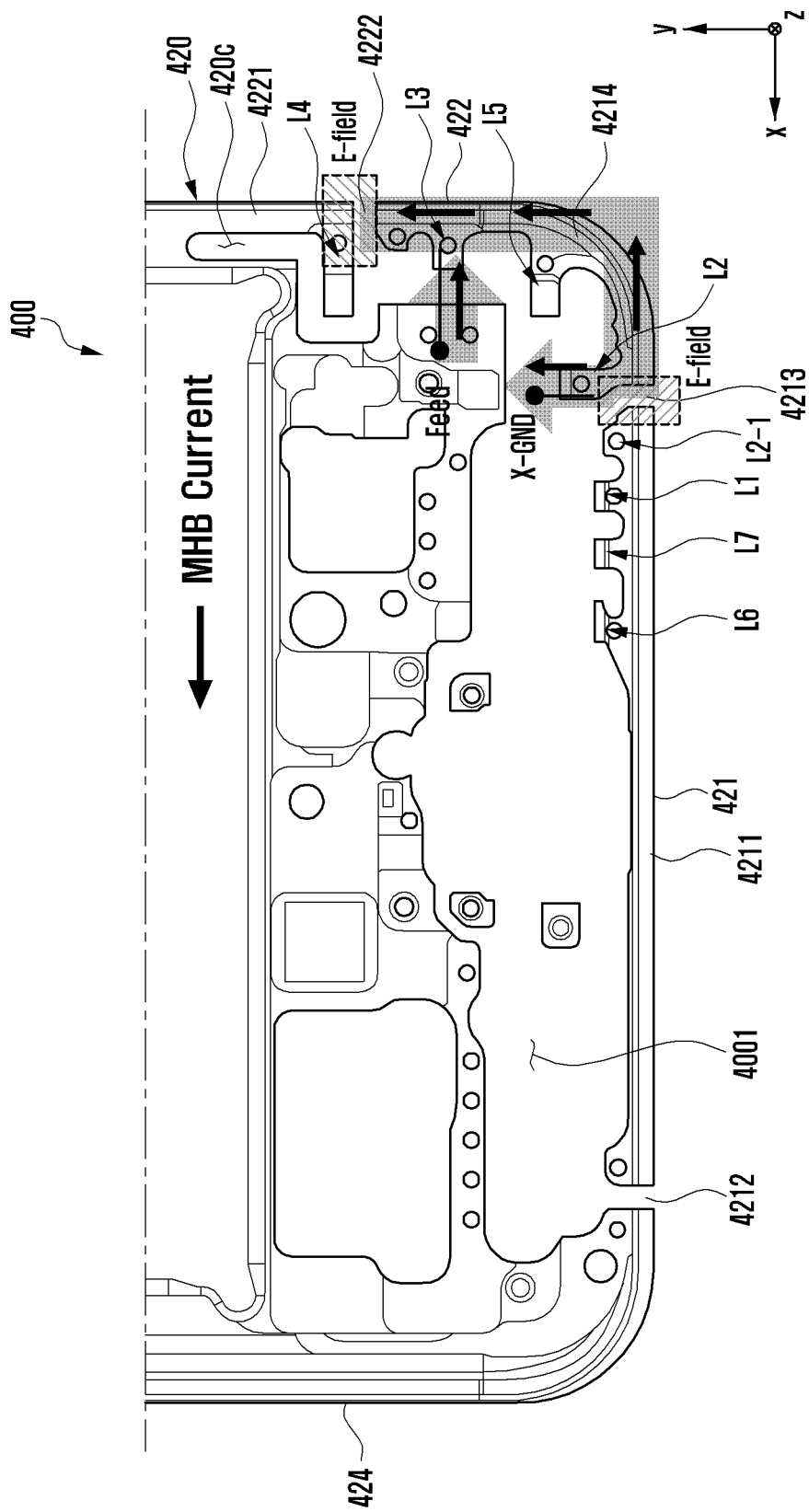

With reference to FIGS. 11A and 11B, the third port P3 of the wireless communication circuit F may be electrically connected to the third point L3 of the second conductive portion 4214 through the third switching circuit S3 disposed in the third electrical path 4303. In this case, the other (second) first point L2-1 of the first conductive portion 4211 and the second point L2 of the second conductive portion 4214 may be electrically disconnected through the second switching circuit S2. According to an embodiment, the second point L2 of the second conductive portion 4214 may remain in a state of being connected to the ground G of the substrate 430 through the second switching circuit S3. Hence, at least some of the second conductive portion 4214 may function as an antenna operating in the mid band and/or high band. For example, as in cases of FIG. 10A and FIG. 11A with operations in the same frequency band, the degree of reduction in the antenna radiation performance according to the grip of the electronic device 400 may be reduced through an appropriate position change in which the feeding point is changed.

Figure 12A:
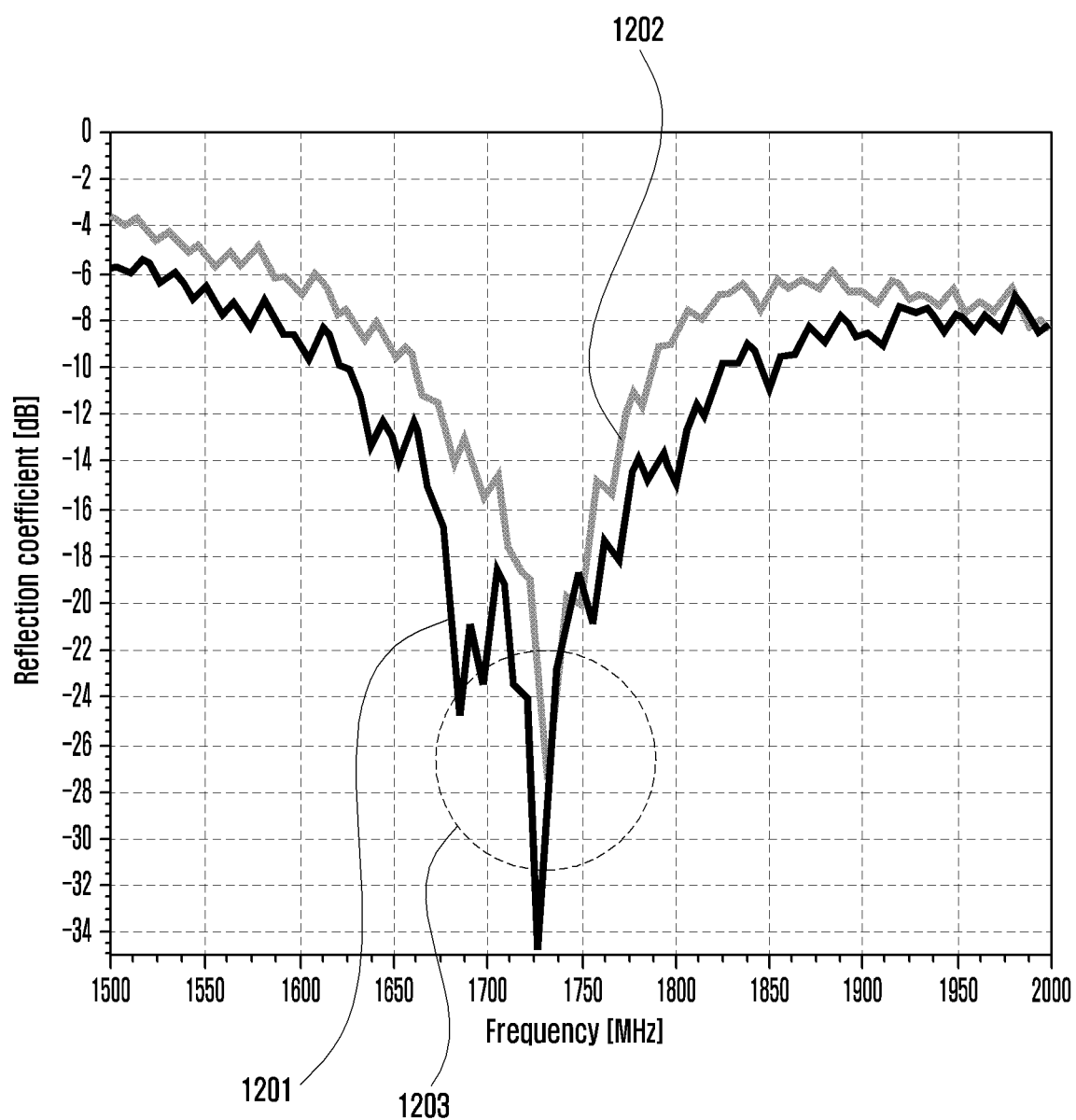
FIGS. 12A and 12B are graphs comparing operating frequency bands of example antennas of FIGS. 10A and 11A in the mid band and the high band according to various embodiments of the disclosure.
Figure 12B:
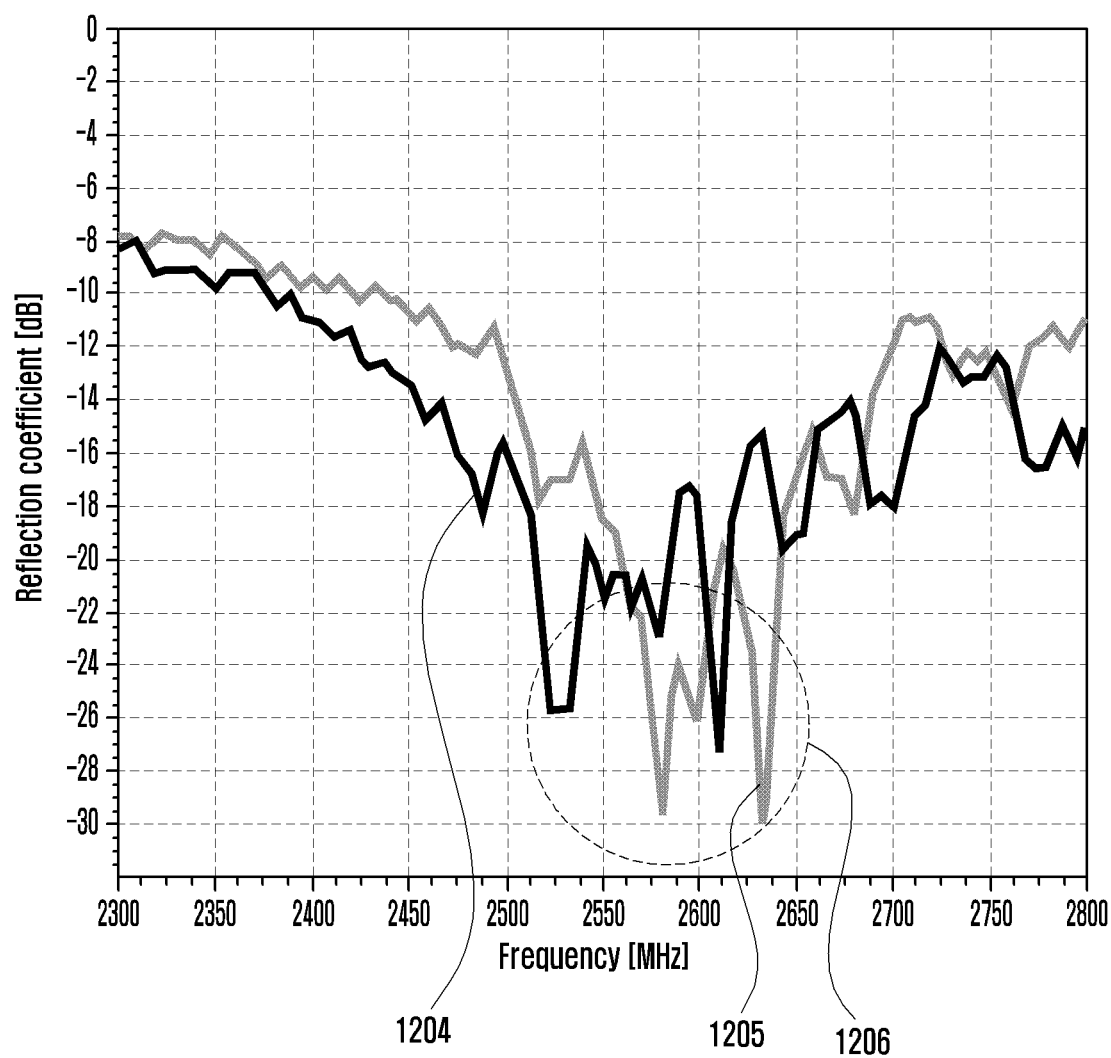

FIGS. 12A and 12B are graphs comparing operating frequency bands of the antennas of FIGS. 10A and 11A in the mid band and the high band according to various embodiments of the disclosure.

With reference to FIG. 12A, it can be seen, in the mid band, that the antenna operates in substantially the same frequency band (range 1203) when being fed through the second point L2 of the second conductive portion 4214 (graph 1201) and when being fed through the third point L3 (graph 1202).

With reference to FIG. 12B, it can be seen, in the high band, that the antenna operates in substantially the same frequency band (range 1206) when being fed through the second point L2 of the second conductive portion 4214 (graph 1204) and when being fed through the third point L3 (graph 1205).

In this case, the electronic device 400 may detect a user's grip and control the switching circuits S2 and S3 based on the detection result to operate the antenna in the ungripped region, decreasing the degree of reduction in radiation performance due to gripping. For example, when a grip is detected at the second point L2, the electronic device 400 may control the switching circuits S2 and S3 to induce feeding through the third point L3, which can decrease the degree of reduction in radiation performance due to gripping.

Figure 13A:
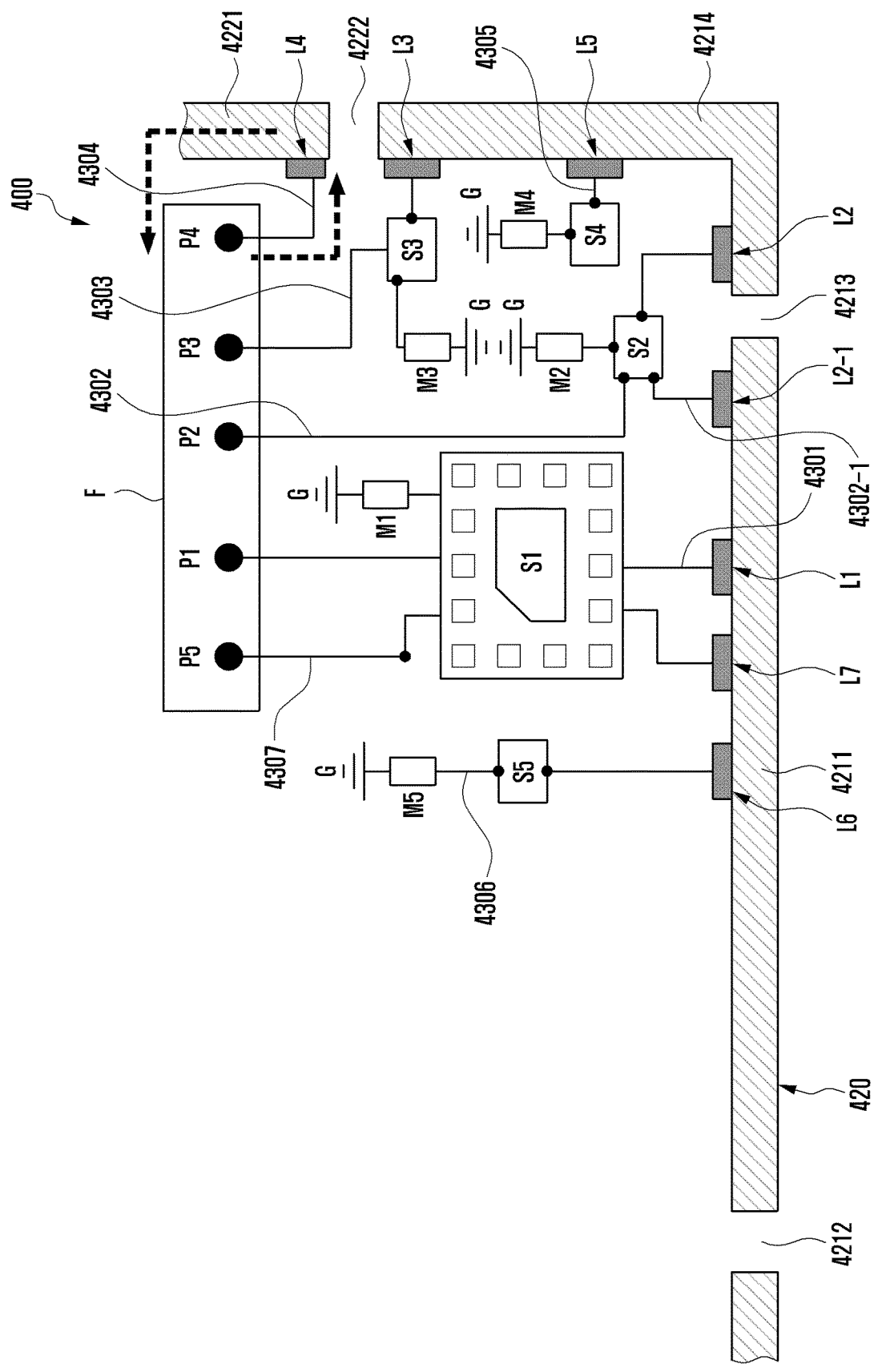
FIGS. 13A and 13B are diagrams illustrating a current flow in an example antenna through feeding at a fourth point of a third conductive portion according to various embodiments of the disclosure.
Figure 13B:
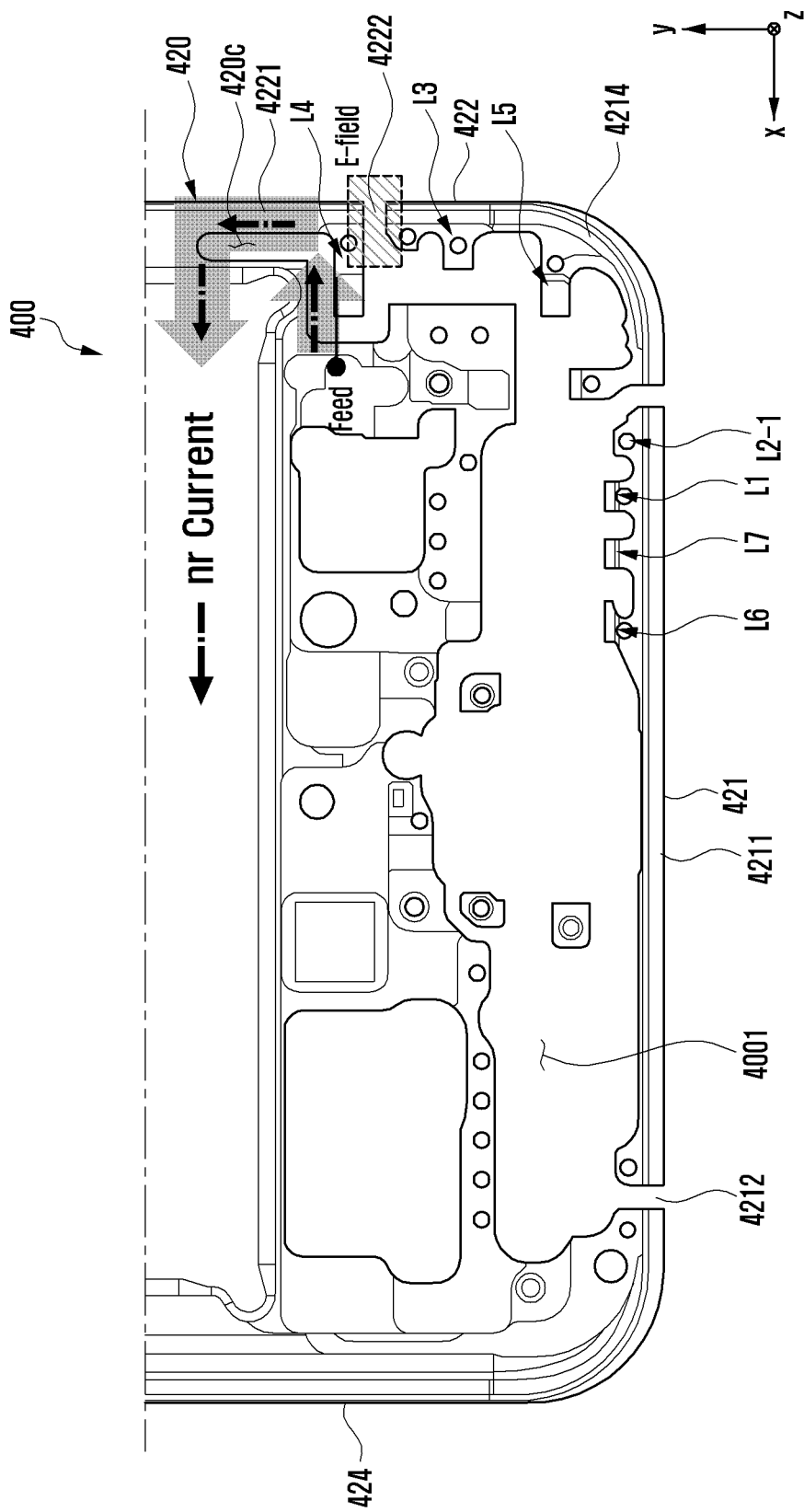

FIGS. 13A and 13B are diagrams illustrating a current flow in an example antenna through feeding at a fourth point of the third conductive portion according to various embodiments of the disclosure.

With reference to FIGS. 13A and 13B, the fourth port P4 of the wireless communication circuit F may be electrically connected to the fourth point L4 of the third conductive portion 4221 through the fourth electrical path 4304. In this case, the antenna may operate in the nr band through the slit 420c having a specified length disposed close to the fourth point L4 of the third conductive portion 4221. In a certain embodiment, the frequency characteristic of the nr band may be adjusted or configured to operate as needed through another switching circuit disposed in the fourth electrical path 4304.

Figure 14:
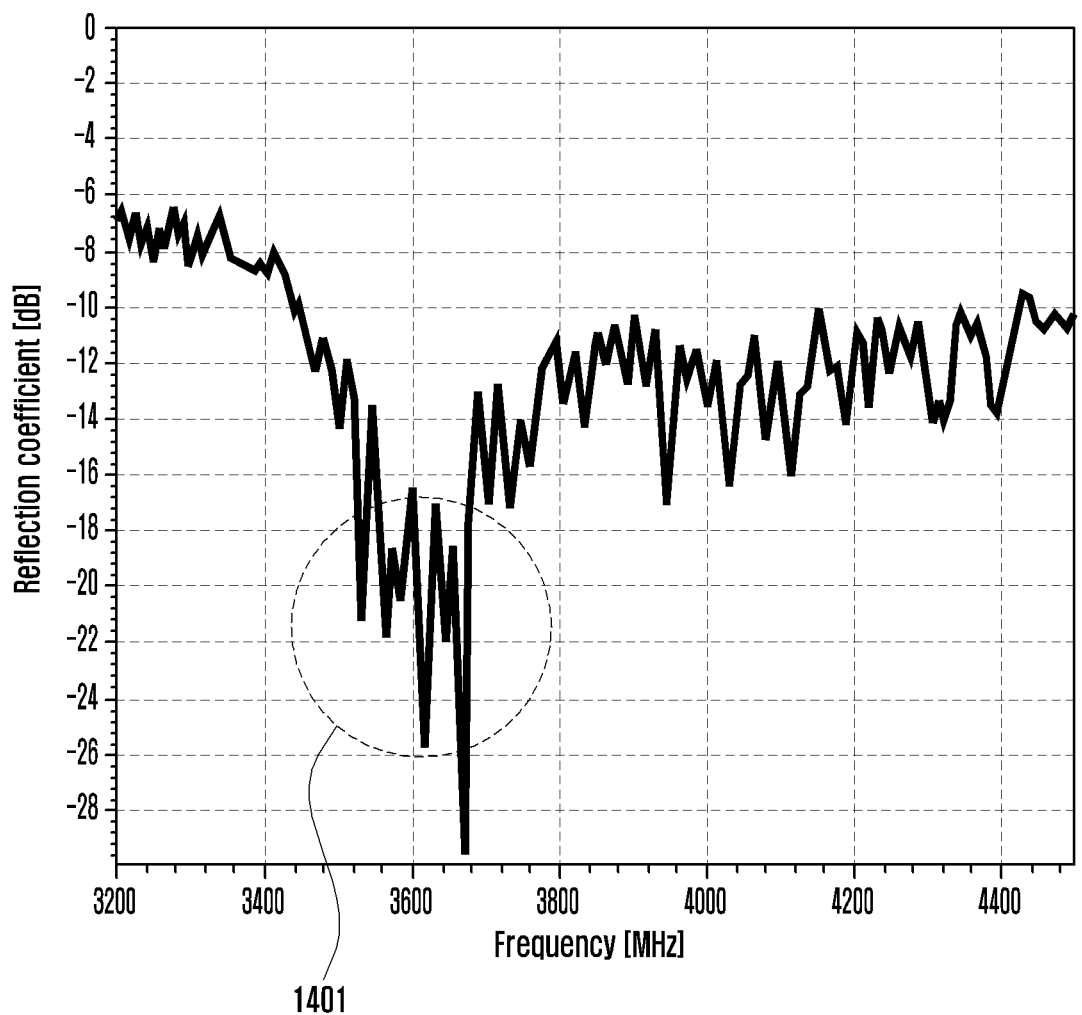
FIG. 14 is a graph illustrating an operating frequency band of an example antenna in FIG. 13A according to various embodiments of the disclosure.

FIG. 14 is a graph illustrating an operating frequency band of an example antenna in FIG. 13A according to various embodiments of the disclosure. It can be seen that the antenna operates smoothly in the nr band (range 1401) (about 3.6 GHz band).

Figure 15:
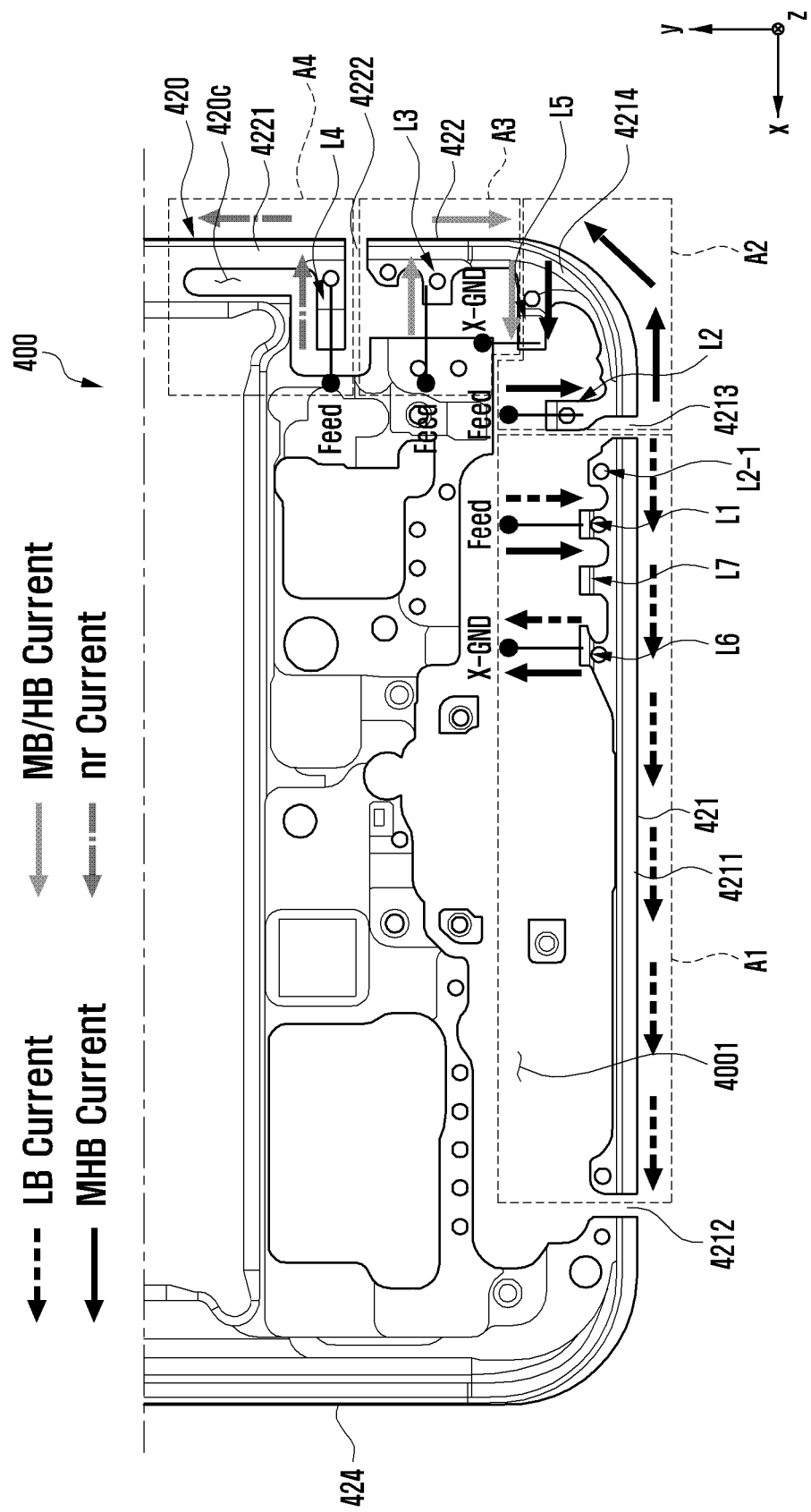
FIG. 15 is a diagram illustrating a current flow in an example antenna in case of E-UTRA NR dual connectivity (EN-DC) or carrier aggregation (CA) according to various embodiments of the disclosure.

FIG. 15 is a diagram illustrating a current flow in an example antenna in case of EN-DC or CA according to various embodiments of the disclosure.

With reference to FIG. 15, the electronic device 400 may control switching circuits (e.g., switching circuits S1, S2, S3, S4 and S5 in FIG. 5) so that the antennas A1, A2, A3 and A4 operate independently of each other in the low band, mid band, high band, and nr band. In this case, as up to four antennas A1, A2, A3 and A4 can be implemented simultaneously, it may be advantageous to support services such as EN-DC (E-UTRA NR dual connectivity) or CA (carrier aggregation), and interference between antennas can be reduced. For example, the four antennas A1, A2, A3 and A4 may include a first antenna A1 implemented to operate in the low band through feeding at the first point L1 disposed on the first conductive portion 4211, a second antenna A2 implemented to operate in the mid band and high band through feeding at the second point L2 disposed on the second conductive portion 4214, a third antenna A3 implemented to operate in the mid band and high band through feeding at the third point L3 disposed on the second conductive portion 4214, and a fourth antenna A4 implemented to operate in the nr band through the fourth point L4 disposed on the third conductive portion 4221 and the slit 420c disposed adjacent thereto. For example, the antennas A1, A2, A3 and A4 may operate independently and secure isolation through separation between antennas by being individually fed at different points L1, L2, L3 and L4 of the first conductive portion 4211, second conductive portion 4214, and third conductive portion 4221.

FIGS. 16A, 16B, 16C, and 16D are graphs illustrating individual operating frequency bands of the antenna in FIG. 15 according to various embodiments of the disclosure.

Figure 16A:
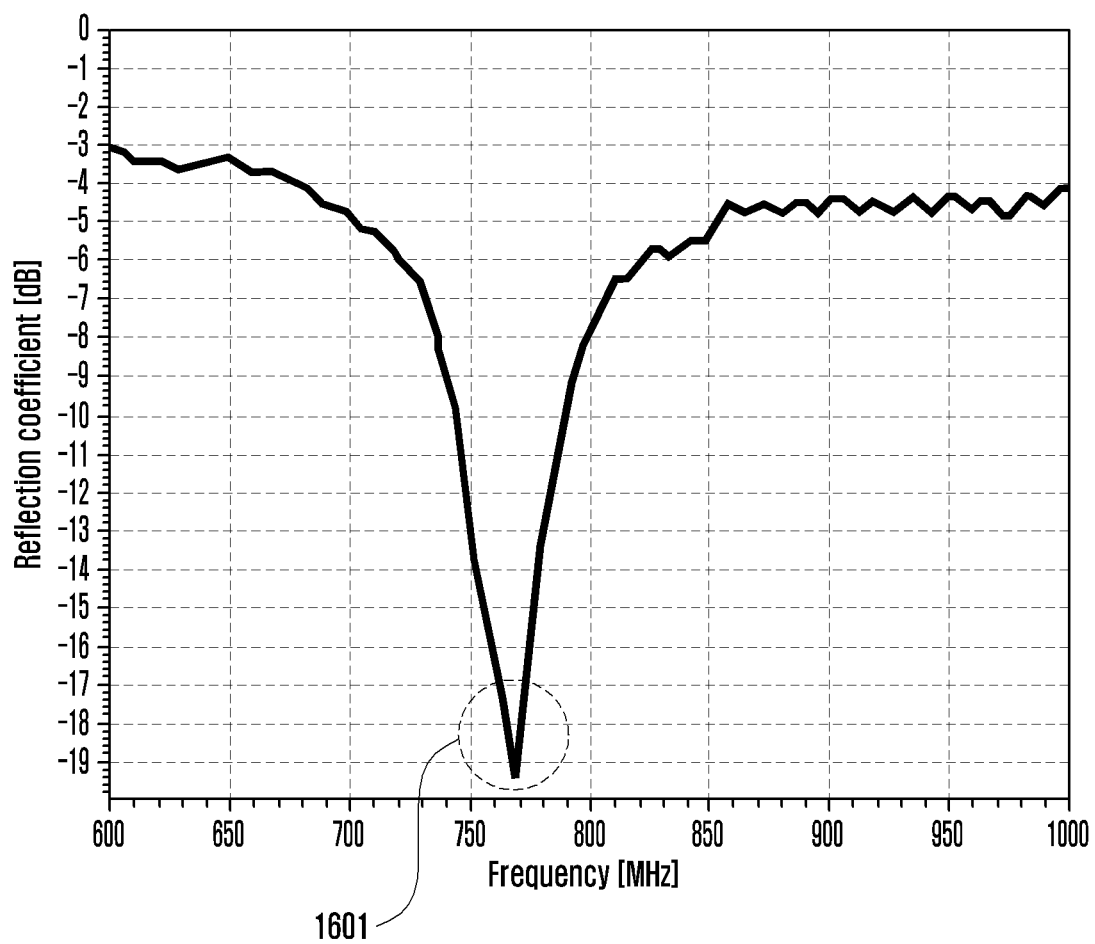
FIGS. 16A, 16B, 16C, and 16D are graphs illustrating individual operating frequency bands of an example antenna in FIG. 15 according to various embodiments of the disclosure.

With reference to FIG. 16A, it can be seen that the first antenna A1 smoothly operates in the low band (range 1601) through feeding at the first point L1 disposed on the first conductive portion 4211.

Figure 16B:
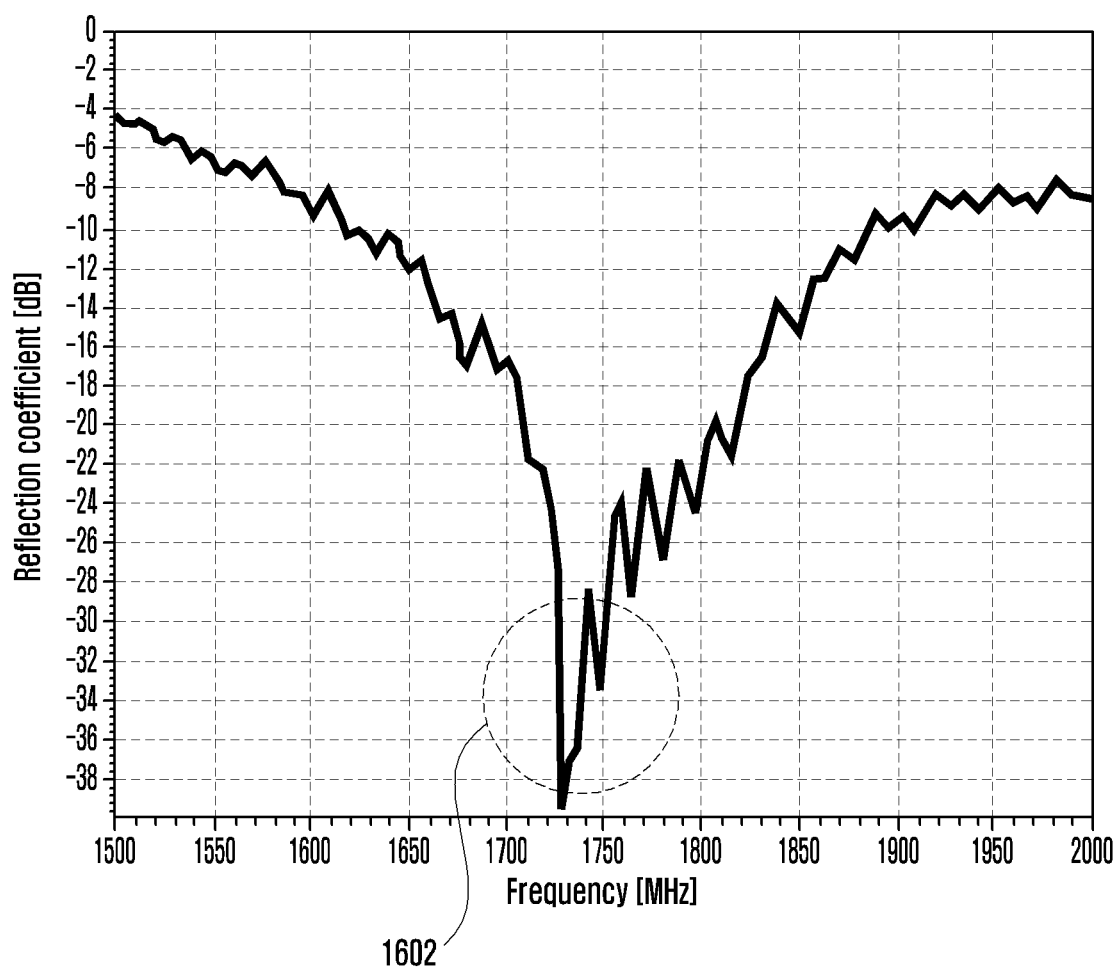
Figure 16C:
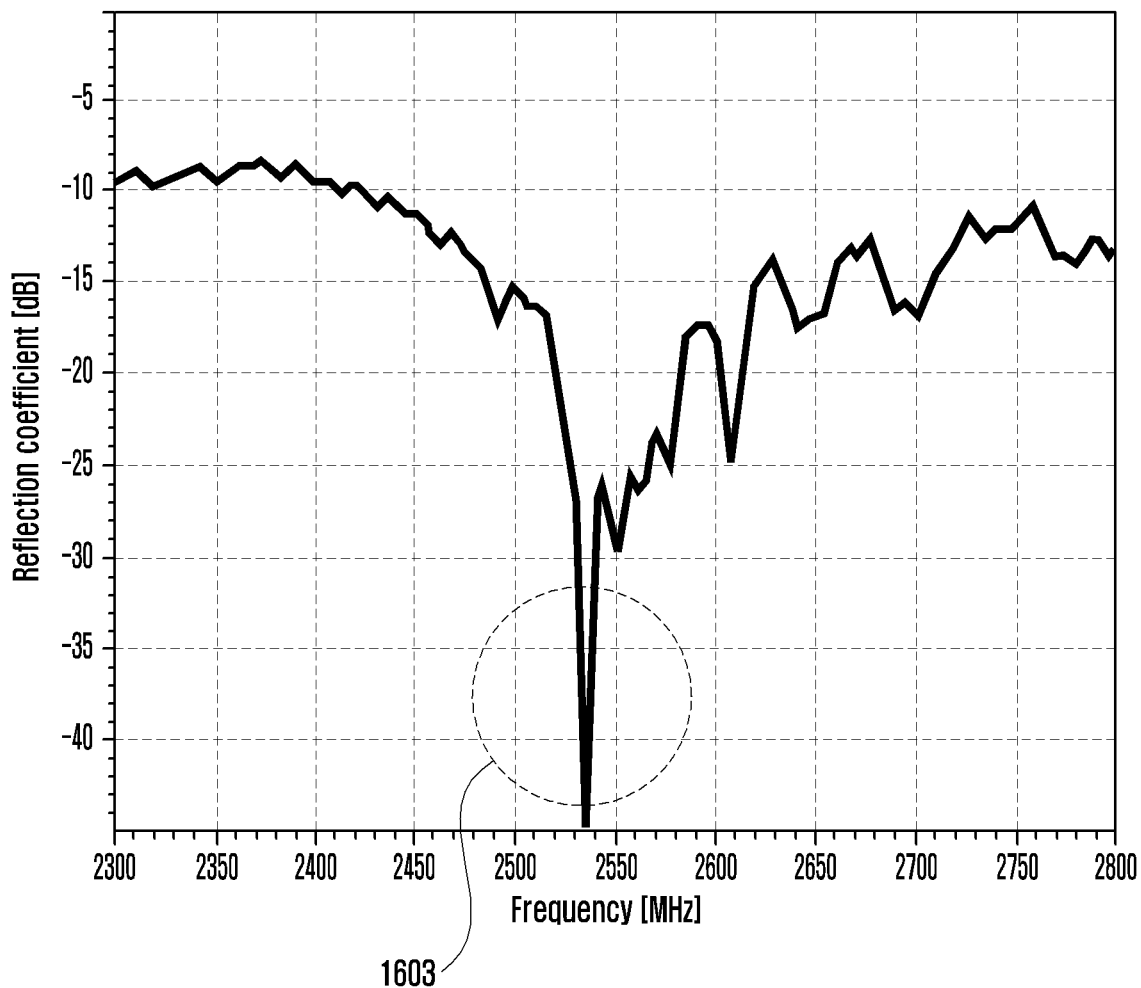

With reference to FIGS. 16B and 16C, it can be seen that the second antenna A2 and/or the third antenna A3 operate smoothly in the mid band (range 1602) and the high band (range 1603) through feeding at the second point L2 and/or the third point L3 disposed on the second conductive portion 4214.

Figure 16D:
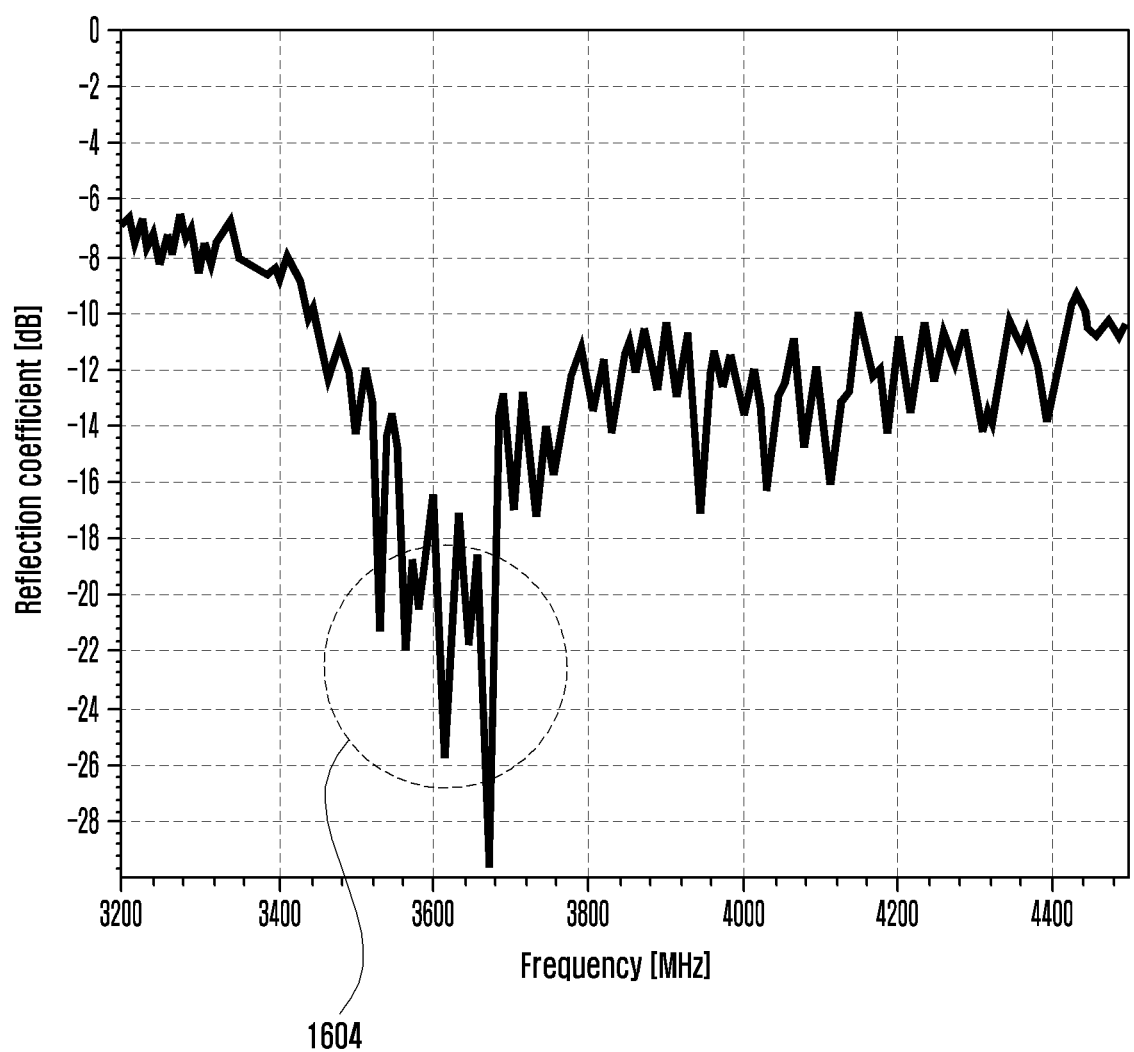

With reference to FIG. 16D, it can be seen that the fourth antenna A4 smoothly operates in the nr band (range 1604) through feeding at the fourth point L1 disposed on the third conductive portion 4221.

Figure 17A:
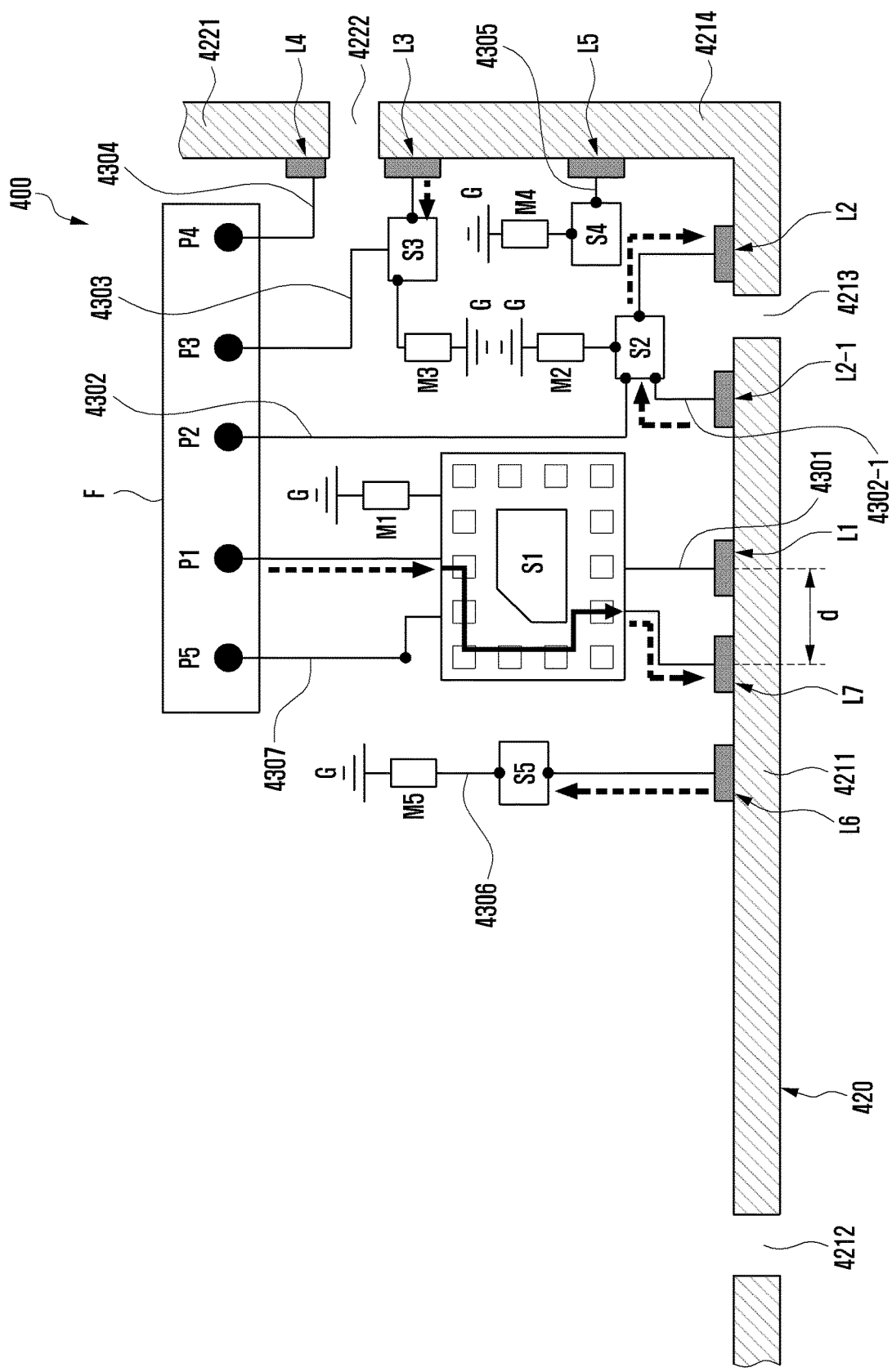
FIGS. 17A and 17B are diagrams illustrating a current flow in an example antenna through feeding at a seventh point of a first conductive portion according to various embodiments of the disclosure.
Figure 17B:
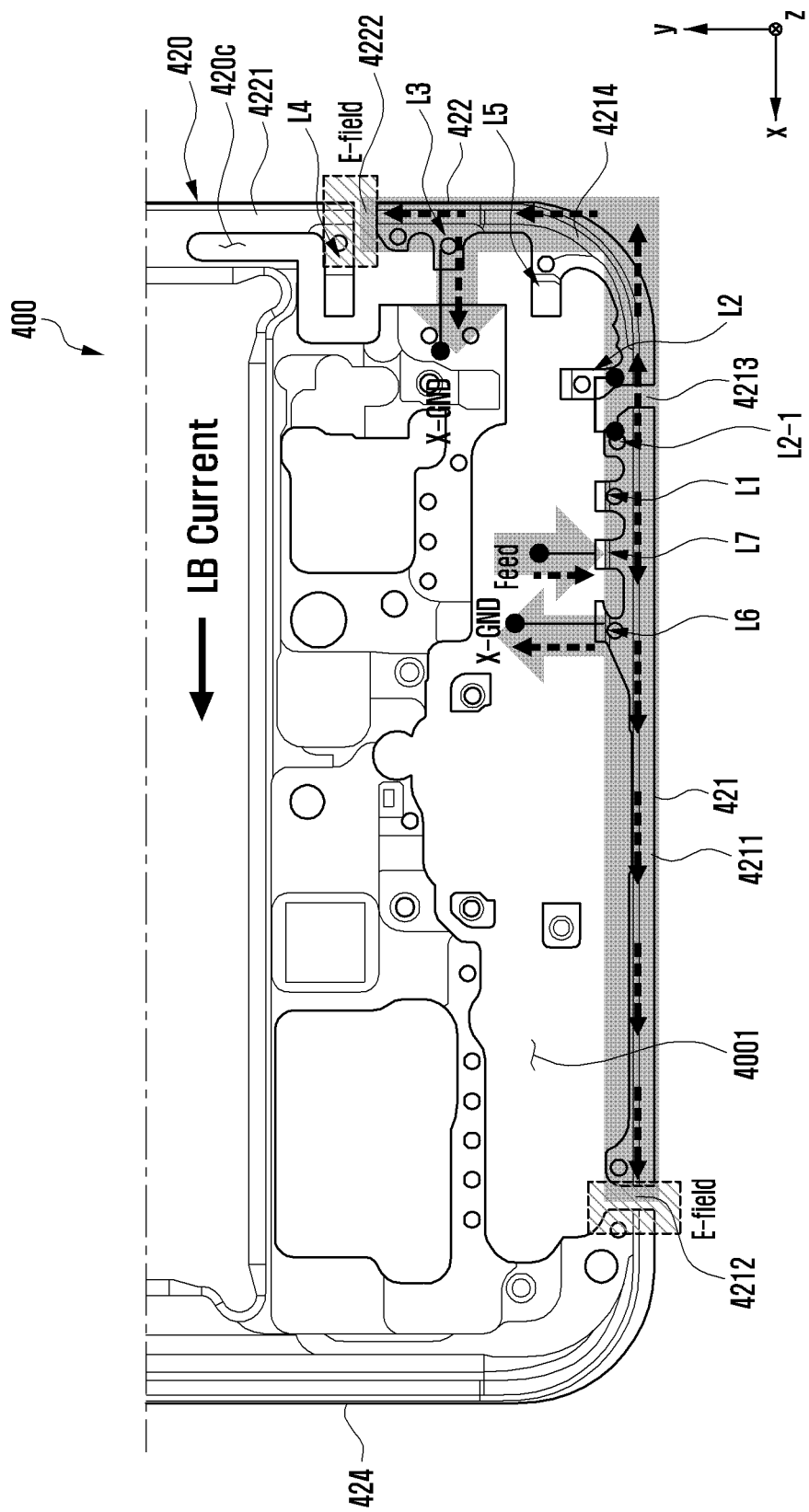

FIGS. 17A and 17B are diagrams illustrating a radiation flow in an example antenna through feeding at a seventh point of the first conductive portion according to various embodiments of the disclosure.

In the description of the electronic device 400 of FIGS. 17A and 17B, the same reference symbols are assigned to the components substantially the same as those of the electronic device 400 of FIGS. 6A and 6B, and detailed descriptions thereof are not repeated here.

With reference to FIGS. 17A and 17B, the fifth port P5 of the wireless communication circuit F may be electrically connected to a seventh point L7 of the first conductive portion 4211 disposed between the first point L1 and the first non-conductive portion 4212 through the seventh electrical path 4307 and the first switching circuit (S1). According to an embodiment, the third point L3 of the second conductive portion 4214 may be connected to the ground G of the substrate 430 through the third switching circuit S3. According to an embodiment, the other (second) first point L2-1 of the first conductive portion 4211 and the second point L2 of the second conductive portion 4214 may remain in a state of being electrically connected through the second switching circuit S2. Hence, at least some of the first conductive portion 4211 and at least some of the second conductive portion 4214 may function as an antenna operating in the low band, mid band, and/or high band, similarly to FIGS. 6A to 6C. In this case, the operating frequency band may be variously adjusted by connecting or disconnecting the fifth point L5 of the second conductive portion 4214 and/or the sixth point L6 of the first conductive portion 4211 to or from the ground G of the substrate 430 through switching of the fourth switching circuit S4 disposed in the fifth electrical path 4305 and/or the fifth switching circuit S5 disposed in the sixth electrical path 4306.

According to various embodiments, the electronic device 400 may include, through the seventh electrical path 4307, an antenna having a current path formed from the seventh point L7 of the first conductive portion 4211 electrically connected to the fifth port P5 of the wireless communication circuit F to the first non-conductive portion 4212. For example, the seventh point L7 may be disposed closer to the first non-conductive portion 4212 by a specified length d than the first point L1. In this case, in the low band, the antenna with feeding at the seventh point L7 may operate in a higher frequency band than the antenna having a feeding structure using the first point L1.

Figure 18:
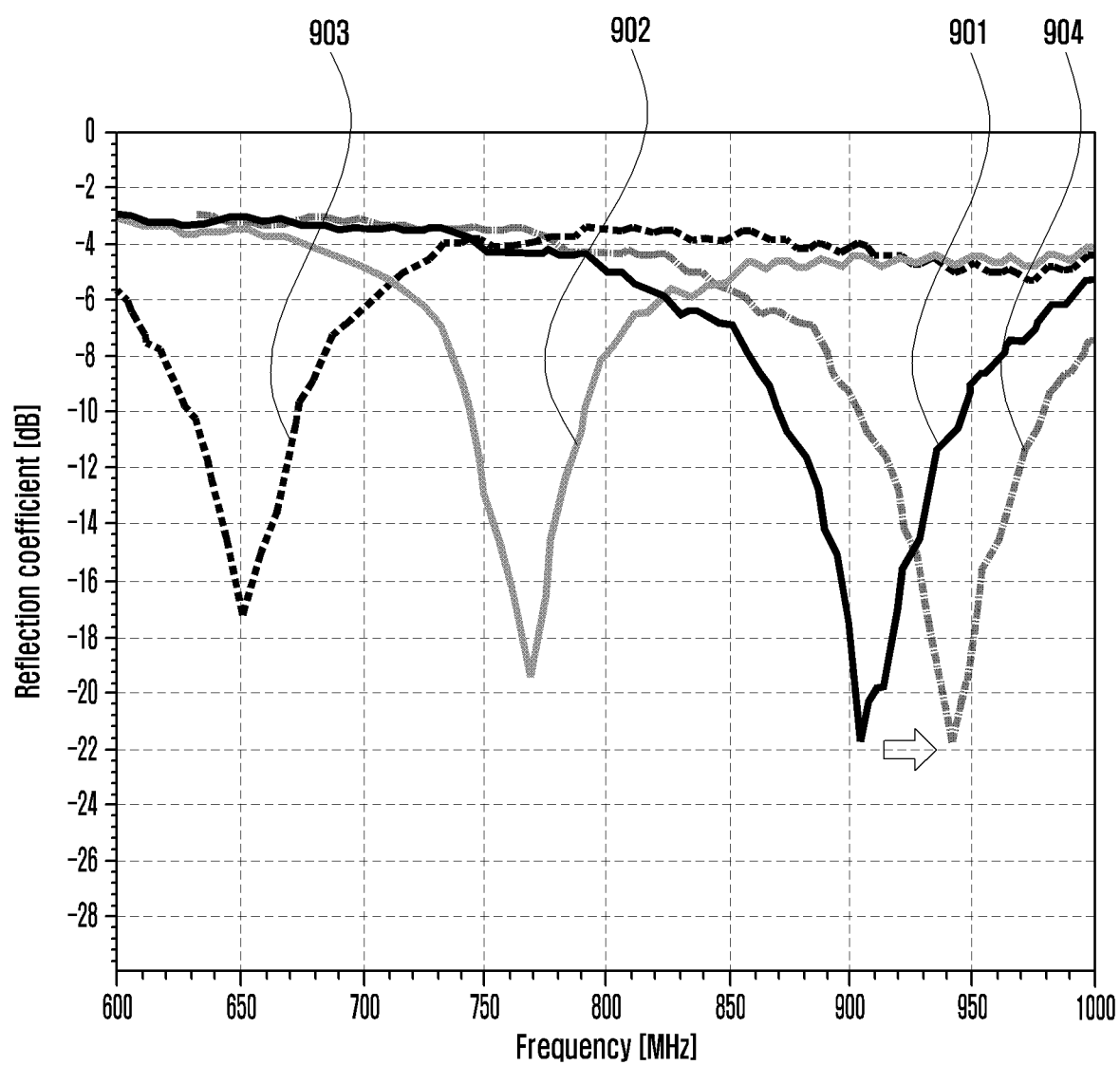
FIG. 18 shows graphs comparing operating frequency bands of an example antenna in the low band when feeding at a seventh point and a first point in the graphs of FIG. 9A according to various embodiments of the disclosure.

FIG. 18 shows graphs comparing operating frequency bands in the low band when feeding at a seventh point and a first point in the graphs of FIG. 9A according to various embodiments of the disclosure.

With reference to FIG. 18, it can be seen, in the low band, that the operating frequency band (graph 904) of the antenna with feeding at the seventh point L7 is relatively higher than the operating frequency band (graph 901) of the antenna having a feeding structure using the first point L1.

According to various embodiments, an electronic device (e.g., electronic device 400 in FIG. 5) may include: a housing (e.g., housing 410 in FIG. 5); a side member (e.g., side member 420 in FIG. 5) disposed in at least some of the housing, and including a first side surface (e.g., first side surface 421 in FIG. 5), a second side surface (e.g., second side surface 422 in FIG. 5) extending in a vertical direction from one end of the first side surface, a third side surface (e.g., third side surface 423 in FIG. 4) extending parallel to the first side surface from the second side surface, a fourth side surface (e.g., fourth side surface 424 in FIG. 5) connected from the third side surface to the first side surface and parallel to the second side surface, a first conductive portion (e.g., first conductive portion 4211 in FIG. 5) disposed through a first non-conductive portion (e.g., first non-conductive portion 4212 in FIG. 5) and a second non-conductive portion (e.g., second non-conductive portion 4213 in FIG. 5) spaced apart at a specified interval in the first side surface, and a second conductive portion (e.g., second conductive portion 4214 of FIG. 5) disposed through the second non-conductive portion and a third non-conductive portion (e.g., third non-conductive portion 4222 in FIG. 5) formed on the second side surface; a substrate (e.g., substrate 430 in FIG. 5) disposed in the internal space (e.g., internal space 4001 in FIG. 5) of the housing and including a ground (e.g., ground G in FIG. 5); at least one wireless communication circuit (e.g., wireless communication circuit F in FIG. 5) disposed on the substrate; a first switching circuit (e.g., first switching circuit S1 in FIG. 5) disposed in a first electrical path (e.g., first electrical path 4301 in FIG. 5) connecting the at least one wireless communication circuit and a first point (e.g., first point L1 in FIG. 5) of the first conductive portion; a second switching circuit (e.g., second switching circuit S2 in FIG. 5) disposed in a second electrical path (e.g., second electrical path 4302 in FIG. 5) connecting the at least one wireless communication circuit and a second point (e.g., second point L2 in FIG. 5) of the second conductive portion; a third switching circuit (e.g., third switching circuit S3 in FIG. 5) disposed in a third electrical path (e.g., third electrical path 4303 in FIG. 5) connecting the at least one wireless communication circuit and a third point (e.g., third point L3 in FIG. 5) of the second conductive portion between the second point and the third non-conductive portion; and at least one processor (e.g., processor 490 in FIG. 5) configured to control at least one switching circuit among the first, second, and third switching circuits, wherein the second switching circuit may be electrically connected to another first point (e.g., the other first point L2-1 in FIG. 5) between the first point and the second non-conductive portion through a second-first electrical path (e.g., second-first electrical path 4302-1 in FIG. 5).

According to various embodiments, the electronic device may further include a third conductive portion disposed through the third non-conductive portion in the second side surface.

According to various embodiments, the at least one wireless communication circuit may be electrically connected to a fourth point of the third conductive portion through a fourth electrical path.

According to various embodiments, the electronic device may include a slit having a specified length connected to the fourth point close to the third conductive portion, and the at least one wireless communication circuit may be configured to transmit or receive a radio signal in an operating frequency band determined through the length of the slit.

According to various embodiments, the length of the slit may be determined to be less than or equal to half the length of the second conductive portion.

According to various embodiments, the at least one wireless communication circuit may be configured to transmit or receive a radio signal in an nr band through the fourth point and the slit.

According to various embodiments, the second point and the second-first point may be electrically connected or disconnected through the second switching circuit.

According to various embodiments, the second point may be located on the first side surface of the side member.

According to various embodiments, the third point may be located on the second side surface of the side member.

According to various embodiments, the electronic device may further include a fourth switching circuit that is disposed in a fifth electrical path connecting a fifth point between the second point and the third point and the ground and is controlled by the at least one processor.

According to various embodiments, the electronic device may further include a fifth switching circuit that is disposed in a sixth electrical path connecting a sixth point between the first point and the first non-conductive portion and the ground and is controlled by the at least one processor.

According to various embodiments, the length of the second conductive portion may be determined to be greater than or equal to ⅓ of the length of the first conductive portion.

According to various embodiments, the length of the second conductive portion may be determined to be shorter than or equal to the length of the first conductive portion.

According to various embodiments, at least one switching circuit among the first switching circuit, the second switching circuit, and the third switching circuit may include a tunable IC switching with one passive element among plural passive elements.

According to various embodiments, the wireless communication circuit may be configured to transmit or receive a radio signal in at least one frequency band among a low band, a mid band, and a high band through the first point, the second point, or the third point.

According to various embodiments, the at least one wireless communication circuit may be electrically connected to a seventh point between the first point and the sixth point through a seventh electrical path.

According to various embodiments, the fourth electrical path may be arranged to pass through the first switching circuit.

According to various embodiments, the first conductive portion, the second conductive portion, and the third conductive portion may be segmented through a cut-off portion, and the cut-off portion may be filled with a non-conductive member.

According to various embodiments, the housing may include a front cover and a rear cover facing in a direction opposite to the front cover, and at least some of the side member may be arranged to surround the internal space between the front cover and the rear cover.

According to various embodiments, the electronic device may include a display that is disposed in the internal space and is visible from the outside through at least some of the front cover.

In addition, the embodiments of the disclosure disclosed in the present specification and drawings are examples provided to easily explain the technical contents of the embodiments of the disclosure and to help understand the embodiments of the disclosure, and are not intended to limit the scope of the embodiments of the disclosure. Therefore, the scope of various embodiments of the disclosure should be interpreted as including both the embodiments disclosed herein and all changes or modifications derived based on the technical spirit of various embodiments of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a side member disposed in at least some of the housing and including a first side surface, a second side surface extending perpendicular to one end of the first side surface, a third side surface extending parallel to the first side surface from the second side surface, a fourth side surface connected from the third side surface to the first side surface and parallel to the second side surface, a first conductive portion disposed between a first non-conductive portion and a second non-conductive portion spaced apart at a specified interval in the first side surface, and a second conductive portion disposed between the second non-conductive portion and a third non-conductive portion formed on the second side surface;
a substrate disposed in an internal space of the housing and including a ground;
at least one wireless communication circuit disposed on the substrate;
a first switching circuit disposed in a first electrical path connecting the at least one wireless communication circuit and a first point of the first conductive portion;
a second switching circuit disposed in a second electrical path connecting the at least one wireless communication circuit and a second point of the second conductive portion;
a third switching circuit disposed in a third electrical path connecting the at least one wireless communication circuit and a third point of the second conductive portion between the second point and the third non-conductive portion; and
at least one processor configured to control at least one switching circuit among the first, second, and third switching circuits,
wherein the second switching circuit is electrically connected to another—first point between the first point and the second non-conductive portion through another—first electrical path.

2. The electronic device of claim 1, further comprising a third conductive portion disposed through the third non-conductive portion in the second side surface.

3. The electronic device of claim 2, wherein the at least one wireless communication circuit is electrically connected to a fourth point of the third conductive portion through a fourth electrical path.

4. The electronic device of claim 3, comprising a slit having a specified length connected to the fourth point adjacent to the third conductive portion, and wherein the at least one wireless communication circuit is configured to transmit or receive a radio signal in an operating frequency band determined according to a length of the slit.

5. The electronic device of claim 4, wherein the length of the slit is less than or equal to half a length of the second conductive portion.

6. The electronic device of claim 4, wherein the at least one wireless communication circuit is configured to transmit or receive a radio signal in an NR band through the fourth point and the slit.

7. The electronic device of claim 1, wherein the second point and the other first point are electrically connected or disconnected through the second switching circuit.

8. The electronic device of claim 1, wherein the second point is located on the first side surface of the side member.

9. The electronic device of claim 1, wherein the third point is located on the second side surface of the side member.

10. The electronic device of claim 1, further comprising a fourth switching circuit disposed in a fifth electrical path connecting a fifth point between the second point and the third point and the ground and controlled by the at least one processor.

11. The electronic device of claim 1, further comprising a fifth switching circuit disposed in a sixth electrical path connecting a sixth point between the first point and the first non-conductive portion and the ground and controlled by the at least one processor.

12. The electronic device of claim 1, wherein a length of the second conductive portion is determined to be longer than or equal to ⅓ of a length of the first conductive portion.

13. The electronic device of claim 1, wherein a length of the second conductive portion is determined to be shorter than or equal to a length of the first conductive portion.

14. The electronic device of claim 1, wherein at least one switching circuit among the first switching circuit, the second switching circuit, and the third switching circuit includes a tunable IC switching with a passive element among plural passive elements.

15. The electronic device of claim 1, wherein the at least one wireless communication circuit is configured to transmit or receive a radio signal in at least one frequency band among a low band, a mid band, and a high band through the first point, the second point, or the third point.

16. The electronic device of claim 11, wherein the at least one wireless communication circuit is electrically connected to a seventh point between the first point and the sixth point through a seventh electrical path.

17. The electronic device of claim 16, wherein the seventh electrical path is arranged to pass through the first switching circuit.

18. The electronic device of claim 1, wherein:
the first conductive portion, the second conductive portion, and the third conductive portion are segmented through a cut-off portion; and
the cut-off portion is filled with a non-conductive member.

19. The electronic device of claim 1, wherein:
the housing includes a front cover and a rear cover facing in a direction opposite to the front cover; and
at least part of the side member is arranged to surround an internal space between the front cover and the rear cover.

20. The electronic device of claim 19, comprising a display that is disposed in the internal space and is visible from an outside through at least part of the front cover.

* * * * *